United States Patent
Kempf et al.

(10) Patent No.: US 11,841,852 B2
(45) Date of Patent: Dec. 12, 2023

(54) TENANT SPECIFIC AND GLOBAL PRETAGGING FOR NATURAL LANGUAGE QUERIES

(71) Applicant: salesforce.com, inc., San Francisco, CA (US)

(72) Inventors: Guillaume Jean Mathieu Kempf, San Francisco, CA (US); Marc Brette, Montbonnot-Saint-Martin (FR); Francisco Dellatorre Borges, Voorburg (NL); Qianqian Shi, Foster City, CA (US); Matthieu Michel Robin Landos, Grenoble (FR); Darya Brazouskaya, La Tronche (FR); Georgios Balikas, Grenoble (FR); Arvind Srikantan, San Francisco, CA (US); Mario Sergio Rodriguez, Santa Clara, CA (US)

(73) Assignee: Salesforce, Inc., San Francisco, CA (US)

( * ) Notice: Subject to any disclaimer, the term of this patent is extended or adjusted under 35 U.S.C. 154(b) by 319 days.

(21) Appl. No.: 17/147,982

(22) Filed: Jan. 13, 2021

(65) Prior Publication Data

US 2022/0156251 A1     May 19, 2022

(30) Foreign Application Priority Data

Nov. 17, 2020   (GR)   .............. 20200100683

(51) Int. Cl.
*G06F 16/00*     (2019.01)
*G06F 16/242*    (2019.01)
*G06F 16/2455*   (2019.01)
*G06F 16/28*     (2019.01)

(52) U.S. Cl.
CPC ........ *G06F 16/243* (2019.01); *G06F 16/2455* (2019.01); *G06F 16/285* (2019.01)

(58) Field of Classification Search
CPC . G06F 16/243; G06F 16/3329; G06F 16/2455
See application file for complete search history.

(56) References Cited

U.S. PATENT DOCUMENTS

2012/0036137 A1* 2/2012 Naidu ................. G06F 16/3326
                                                   707/E17.084
2017/0024461 A1* 1/2017 Mac an tSaoir ...... G06F 16/334

* cited by examiner

*Primary Examiner* — Thu Nguyet T Le
(74) *Attorney, Agent, or Firm* — Holland & Hart LLP

(57) ABSTRACT

A database system may receive a natural language query that is associated with a tenant of a multi-tenant system. The natural language query may be parsed into a set of tokens, and the set of tokens may be tagged, using a tenant specific tagging model associated with the tenant, the set of tokens with at least one pre-configured data type identifier that is configured for the plurality of tenants. A global tagging model that supports the plurality of tenants of the multi-tenant system may tag the set of tokens with at least one category identifier. The global tagging model may use the natural language query and the pre-configured data type identifier to identify the at least one category identifier. The system may execute a database query on a database associated with the tenant using the at least one pre-configured data type identifier and the at least one category identifier.

19 Claims, 13 Drawing Sheets

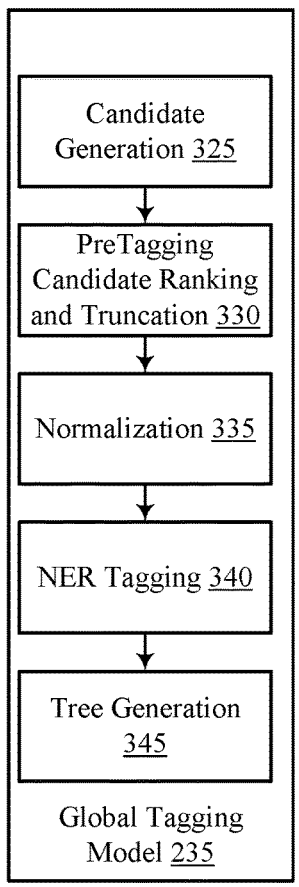

```
query = "my hospital capacity free beds hospitals"
pretagged = {"hospital", "hospitals", "hospital capacity free beds"}
Candidates = {
        505-a ~ {PreTaggingNode("hospital")},
        505-b ~ {PreTaggingNode("hospital capacity free beds")},
        505-c ~ {PreTaggingNode("hospitals")},
        505-d {
            PreTaggingNode("hospital"),
            PreTaggingNode("hospital capacity free beds")
        },
        505-e {
            PreTaggingNode("hospital capacity free beds")
            PreTaggingNode("hospitals")
        },
        505-f {
            PreTaggingNode("hospital"),
            PreTaggingNode("hospitals")
        },
        505-g {
            PreTaggingNode("hospital"),
            PreTaggingNode("hospital capacity free beds"),
            PreTaggingNode("hospitals"),
        }
}
```

Candidate Generation 325

PreTagging Candidate Ranking and Truncation 330

Normalization 335

NER Tagging 340

Tree Generation 345

Global Tagging Model 235

```
Valid and ranked candidates = {
    1. {
    PreTaggingNode("hospital capacity free beds"),
    PreTaggingNode("hospitals")
    },
    2. {PreTaggingNode("hospitals")},
    3. {PreTaggingNode("hospital")}
}
```

Nested Ranking Rules:
1.  The candidate having the highest pretagged token count.
    $1^{st}$ – "my [account] [industry media]"
    $2^{nd}$ – "my [account] industry media"
2.  The candidate having the lowest number of pretagged concepts.
    $1^{st}$ – "[opportunity type in progress] [opportunities]"
    $2^{nd}$ – "[opportunity type] [in progress] [opportunities]"
3.  The concepts tagged at the end of the query.
    $1^{st}$ – "lead force [accounts]"
    $2^{nd}$ – "[lead] force account"

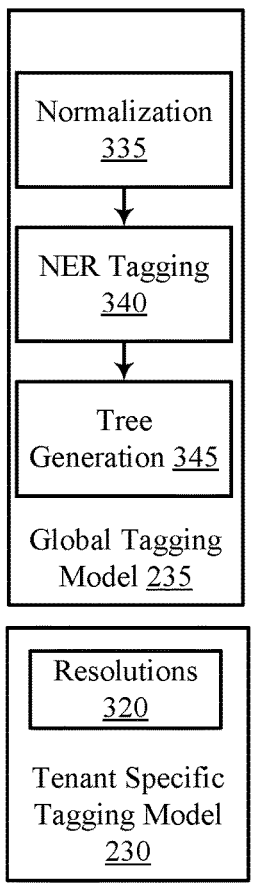

```
Valid and ranked candidates = {
    1. {
    PreTaggingNode("hospital capacity free beds"),
    PreTaggingNode("hospitals")
    },
    2. {PreTaggingNode("hospitals")},
    3. {PreTaggingNode("hospital")}
}

Queries sent to NER for each candidate:
1. my PICKLIST ENTITY_ACCOUNT
2. my hospital capacity free beds ENTITY ACCOUNT
3. my ENTITY ACCOUNT capacity free beds hospitals NER tags:
1. my|MINE PICKLIST|(ignore) ENTITY_ACCOUNT|(ignore)
2. my|MINE hospital capacity|ORG free|O beds|O
ENTITY_ACCOUNT|(ignore)
3. my|MINE ENTITY_ACCOUNT|(ignore) capacity|O free|O beds |O Ranked Trees:
1. acc(2, mine(0) picklist(1))
2. acc(4, mine(0), org(1), other(2), other(3))
3. acc(1, mine(0), other(2), other(3), other(4), other(5))

Nested Ranking Rules:
1. The tree having the highest non-other token count.
        1st – [NodeAcc("accounts") , (NodeRecId("einstein search")]
        2nd – [NodeAcc("accounts") , (NodeOther("einstein search")]
2. The tree having the lowest number of non-other nodes.
        1st – [NodeAcc("accounts") , (NodeRecId("einstein search")]
        2nd – [NodeAcc("accounts") , (NodeRecId("einstein"),
        NodeRecId("search")]
        3rd – [NodeAcc("accounts") , (NodeOther("einstein search")]
3. The tree having the highest root position.
        1st – [NodeRecId("einstein search"), NodeAcc("accounts")]
        2nd – [NodeAcc("accounts"), NodeRecId("einstein search")]
```

TENANT SPECIFIC AND GLOBAL PRETAGGING FOR NATURAL LANGUAGE QUERIES

CROSS REFERENCES

The present Application for Patent claims priority to Greek Patent Application No. 20200100683 by Kempf et al., entitled "TENANT SPECIFIC AND GLOBAL PRETAGGING FOR NATURAL LANGUAGE QUERIES," filed Nov. 17, 2020, assigned to the assignee hereof.

FIELD OF TECHNOLOGY

The present disclosure relates generally to database systems and data processing, and more specifically to tenant specific and global pretagging for natural language queries.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Some systems may support natural language queries for data retrieval. To support natural language queries, a database administrator may maintain a mapping of possible variations of natural language structures to valid database queries. However, these mapping techniques may not be useful to capture intent or nuance in a natural language query, and thus may result in inadequate or inaccurate query results.

BRIEF DESCRIPTION OF THE DRAWINGS

FIG. 5 illustrates an example of a tagging system that supports tenant specific and global pretagging for natural language queries in accordance with aspects of the present disclosure.

FIG. 6 illustrates an example of a tagging system that supports tenant specific and global pretagging for natural language queries in accordance with aspects of the present disclosure.

DETAILED DESCRIPTION

Some systems may support natural language queries for data retrieval. To support natural language queries, a database administrator may maintain a mapping of possible variations of natural language structures to valid database queries. However, these mapping techniques may not be useful to capture intent or nuance in a natural language query, and thus may result in inadequate or inaccurate query results.

Techniques described herein support leveraging data associated with a specific tenant or organization of a database system and global data used by a plurality of tenants of the database system to provide information in response to a natural language query (NLQ) or natural language search (NLS) system. Further, these techniques provide data security in that tenant specific data may not be used to train a global NLQ model. The system uses a tenant specific tagging model that is associated with the tenant to identify, from a query, a data type identifier that is configured for a plurality of tenants. That is, the tenant specific tagging model may identify a tenant specific term of the query that is associated with a global data schema that may be used by a plurality of tenants. Thereafter, a global tagging model may be used to tag a query with one or more categories. The global tagging model may use named entity recognition (NER) techniques to identify the categories and may identify the categories based on the pre-configured data type identifiers identified by the tenant specific tagging model. The global tagging model may output a set of ranked semantic search trees, which may be validated based on the underlying database. The validated semantic trees may be executed on the database, which may result in more accurate and useful search results than other natural language search systems.

The tenant specific model may use a set of chained or linked taggers. In some examples, an output of a first model may be used as input for the second model of the tenant specific tagging model. Further, the global tagging model may generate and rank tagging candidates, delete invalid candidates, and normalize candidates, in addition to other operations, for generation of the semantic search trees.

Aspects of the disclosure are initially described in the context of an environment supporting an on-demand database service. Aspects of the disclosure are further described with reference to various processes and components that implement the features described herein and with reference to a process flow diagram. Aspects of the disclosure are further illustrated by and described with reference to apparatus diagrams, system diagrams, and flowcharts that relate to tenant specific and global pretagging for natural language queries.

Figure 1:
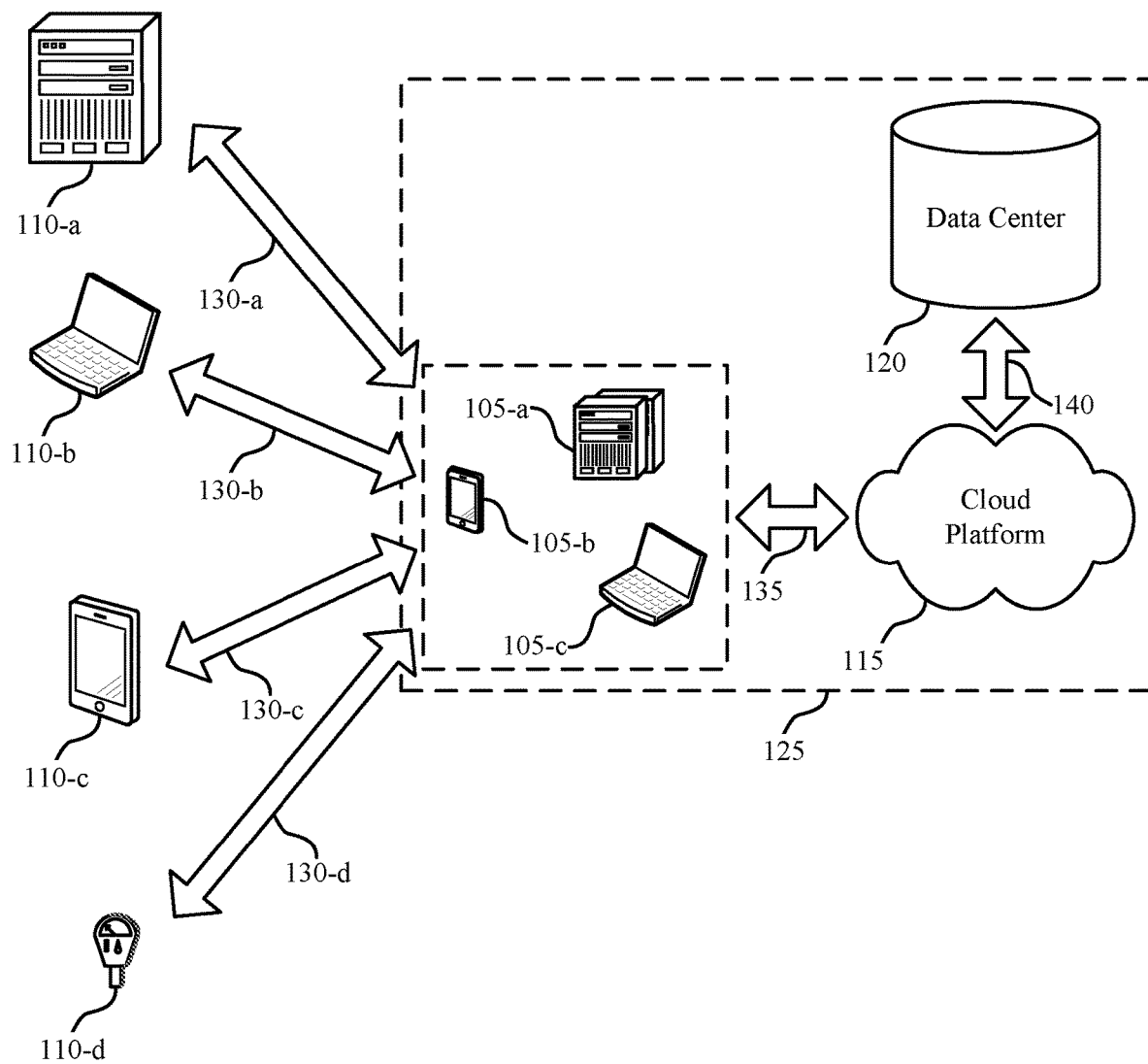
FIG. 1 illustrates an example of a system for data processing that supports tenant specific and global pretagging for natural language queries in accordance with aspects of the present disclosure.

FIG. 1 illustrates an example of a system 100 for cloud computing that supports tenant specific and global pretagging for natural language queries in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud platform 115 may support natural language searching for data of the data center 120. For example, the cloud platform 115 may support a database query application that receives queries from users, such as users of a cloud client 105 or a contact 110, and executes database queries against the data center 120 based on the received queries.

Some systems may support queries that are based on natural language queries that are received from users. To support natural language queries, some systems maintain a mapping of grammatical structures to a set of predefined database queries. The system may receive a query, identify the grammatical structures in the query, and determine which of the predefined database queries map to the identified grammatical structure. In some cases, however, these techniques may not accurately identify query words to symbols such as persons, organizations, time expressions, etc. Further, using keyword searching to support natural language queries may require issuing a relevant query, navigating to the results, and manually inspecting the results. Further, in a multi-tenant system, each tenant may have various types of data that results in different entities or concepts that may be searched. Thus, a mapping may be configured for each tenant, which may be difficult to maintain, resource intensive, and may not capture the data variations for each tenant. Some systems may mine data logs to create training datasets that are tenant specific, but users may not type queries again because the users may learn that the query is unsupported. This may result in a sparse training set and an unusable model. Further, the generated mappings may not capture changes to the database schema or ambiguities in the query.

Techniques described herein provide a system that supports natural language queries for a database system that supports a plurality of tenants. A tenant (e.g., a cloud client 105) may be configured with a tenant specific tagging model that is configured with or trained on the data that is specific to the particular tenant. Thus, the tenant specific model may be configured to identify query terms or tokens that are specific to the tenant and tag such terms with a pre-configured data type identifier that may be used by multiple tenants (e.g., multiple cloud clients 105) of the multi-tenant system. The system may also leverage a global tagging model that used NER techniques to identify query terms or tokens that may be globally used, such as names and other colloquial terms, and provide additional global tags for the query. By using a tenant specific and global model, the system may generate semantic search trees based on the tenant specific and global tags that may be executed against a database system (e.g., data center 120) resulting in more accurate search results that captures the users' intent in entering the queries. Further, since some tenants may have data privacy considerations, the tenant data may not be used to train the global tagging model.

It should be appreciated by a person skilled in the art that one or more aspects of the disclosure may be implemented in a system 100 to additionally or alternatively solve other problems than those described herein. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

For example, a user may enter a query such as "my open opportunities in New York" into a search user interface (UI) supported by the system described herein. The tenant specific model may identify that the term "opportunity" is an "opportunity object" or data type that is associated with or used by the tenant and tag the term opportunity as such. The global model may identify the term "New York" as a city or a state using a NER model. Further, the global model may identify "open" as referring to a Boolean "isOpen." The global model may tag the query with the identified categories and generate semantic search trees based on the tenant specific tags and the global tags. Valid semantic search trees may be executed against the tenant specific database to identify search results.

Figure 2:
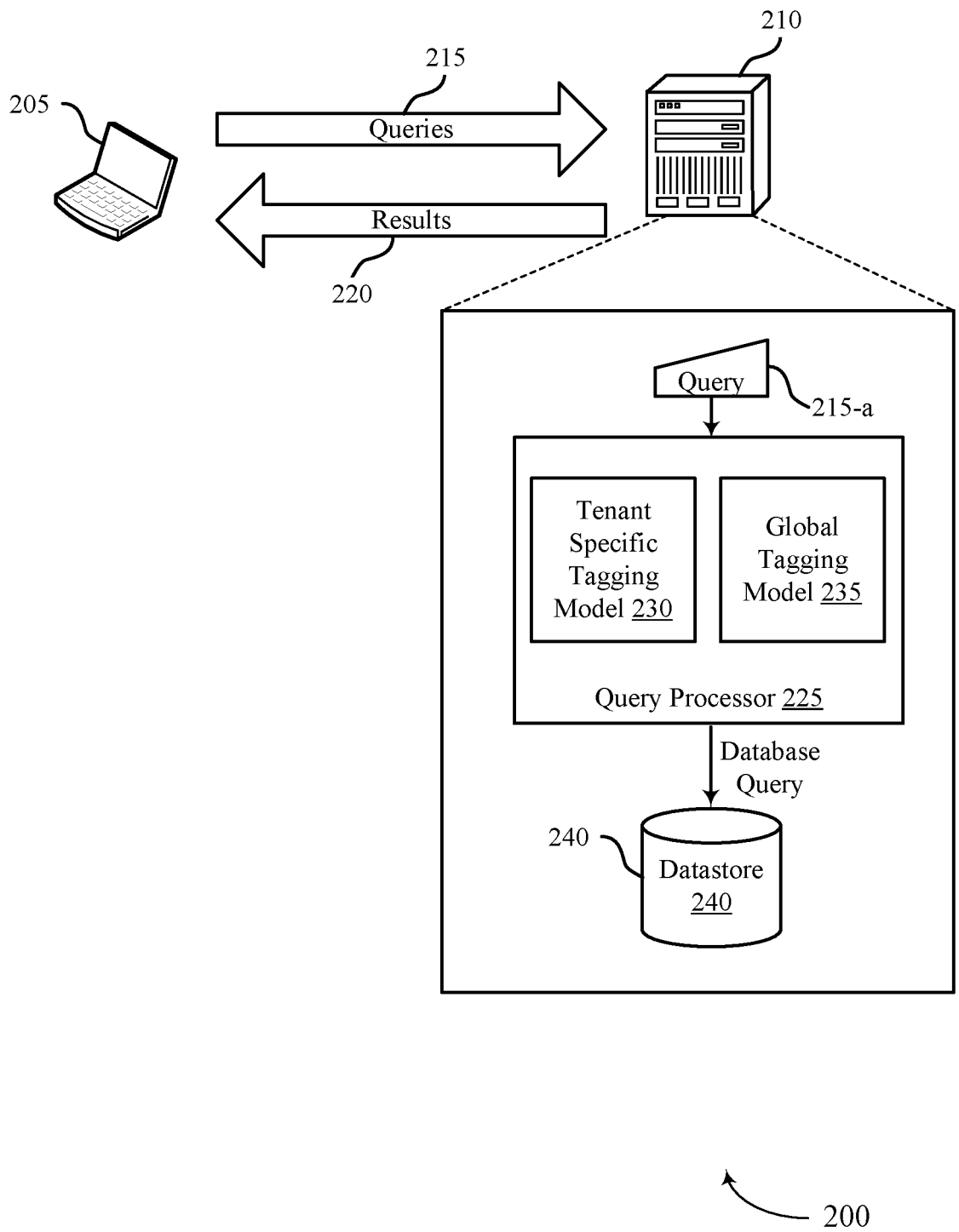
FIG. 2 illustrates an example of a general computing system diagram that supports tenant specific and global pretagging for natural language queries in accordance with aspects of the present disclosure.

FIG. 2 illustrates an example of a general computing system diagram 200 that supports tenant specific and global pretagging for natural language queries in accordance with aspects of the present disclosure. The general computing system diagram 200 includes a user device 205 and a server 210. The user device 205 may be an example of a device that is used by a cloud client 105 or a contact 110 of FIG. 1. For example, a sales manager of a cloud client 105 may use the user device 205 to access data and service supported by the cloud platform 115 of FIG. 1. The server 210 may be an example of an application server, database server, and/or other aspects of the cloud platform 115 and the data center 120 of FIG. 1.

The user may enter queries 215 into a user interface that is supported by the server 210 at the user device 205, and the server 210 may return query results 220 to the user device 205. Results 220 may be in the form of an answer, a record, a list of records, or the like. A user may enter keyword searches or natural language searches as queries 215. In some examples, the server 210 may be configured to differentiate between keyword searches and natural language searches. For the server 210 to determine whether a query 215-a is a natural language search, various techniques described herein may be activated. For example, to determine that query 215-a is a natural language query, the query may be processed by a query processor 225, which may include a tenant specific tagging model 230 and a global tagging model 235.

The tenant specific tagging model 230 may be associated with and configured for a specific tenant of a multi-tenant system. The tenant specific tagging model may be configured with access to data associated with the tenant, such as data stored in datastore 240, which may be an example of a database, database system, multi-tenant database, and the like. More particularly, the tenant specific tagging model 230 may access data and the data schema of the datastore 240, but may not access data stored in the datastore 240 and associated with other tenants. In some examples, each tenant specific tagging model 230 may utilize the same or similar logic or code but access the tenant data and schema that may be unique for a particular tenant. In some cases, the logic or code may be different per tenant or set of tenants.

In some examples, before or after determining that the query 215-a is a natural language search, the tenant specific tagging model 230 may be configured to parse the query into a set of tokens. The tenant specific tagging model 230 may be further configured to tag the set of tokens (e.g., tokens of the query) with at least one pre-configured data type identifier (e.g., concept) that is configured for the plurality of tenants. A data type identifier may be an example of an object identifier, value identifier, or the like. For example, the plurality of tenants may use "account" objects, which may be examples of data objects with a set of fields that correspond to an account. Each tenant may use the account object differently. More particularly, each tenant my customize their database schema differently. In one example, a tenant may have a set of accounts that correspond to hospitals. Thus, when a user enters a query with the token "hospital," the tenant specific tagging model 230 may identify that the token hospital may be an example of an account object. As such, the tenant specific tagging model 230 may be configured to identify entity names (e.g., account names, contact names, lead names, case names, etc.) that are used by the specific tenant but that correspond to global data schema. The tenant specific tagging model 230 may also be configured to identify specific values for a field or column that are used by the tenant. For example, a field may be defined "product color" and various colors may be listed. The tenant specific tagging model 230 may be configured to identify that a query token including one of the colors may be an example of product color and tag the token as a "value," which may be an example of a data type used by a plurality of tenants. In some cases, "value" may be an example of a "picklist" item. Picklist may refer to a list of values that correspond to a particular name or field. Thus, each value may be an example of a "value" corresponding to the field name (e.g., a list of name-value pairs). Accordingly, in some examples, the tenant specific tagging model 230 may identify that a particular token of a query 215 is an example of a picklist item.

The tenant specific tagging model 230 may generate a listing of tokens and the associated identified data type identifier for one or more of the tokens. This listing may be ingested by the global tagging model 235. The global tagging model begins a semantic tree generation process by generating and truncating candidates and normalizing candidates. The normalized candidates may be input into a named entity recognition tagging model, which outputs the candidates with categories, concepts, or the like (e.g., names, places, times) that are identified. The named entity recognition tagging model may be an example of a trained machine learning model. In some examples, the machine learning model is not trained on tenant specific data, such that tenant specific data is secure. The global tagging model 235 may output a set of ranked semantic search trees, which may be validated against the datastore 240. The valid semantic search trees may be executed on the datastore 240, and a set of results 220 may be returned to the user device 205.

Figure 3:
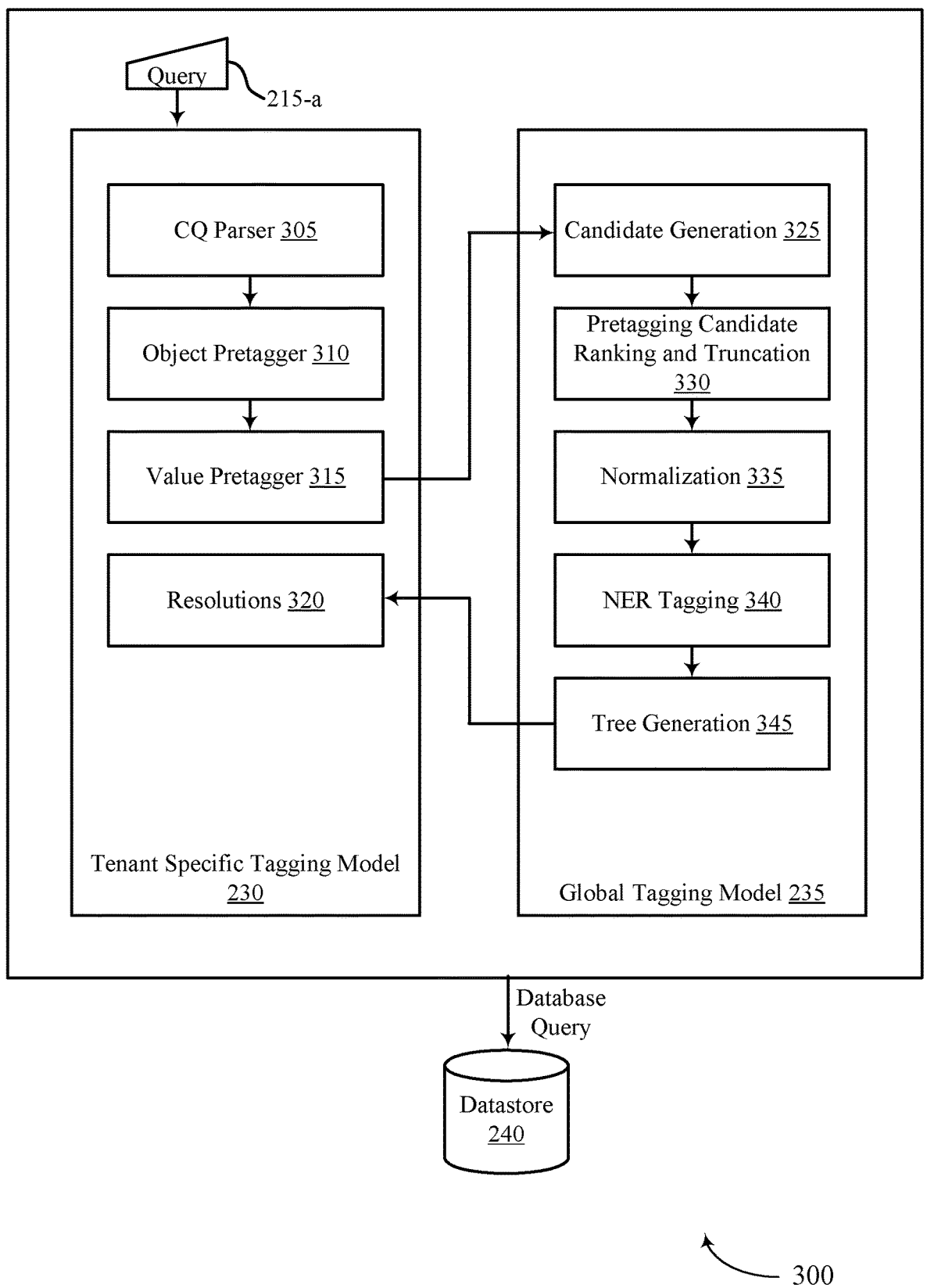
FIG. 3 illustrates an example of a tagging system that supports tenant specific and global pretagging for natural language queries in accordance with aspects of the present disclosure.

FIG. 3 illustrates an example of a tagging system 300 that supports tenant specific and global pretagging for natural language queries in accordance with aspects of the present disclosure. Specifically the tagging system 300 of FIG. 3 illustrates various components of the tenant specific tagging model 230 and the global tagging model 235 as illustrated with respect to FIG. 2. The various components of the tenant specific tagging model 230 and the global tagging model 235 and associated processes may be implemented by various computing systems, such as the cloud platform 115 and the data center 120 of FIG. 1. and the server 210 of FIG. 2. The components of the tenant specific tagging model 230 and the global tagging model 235 may be implemented in the same components (e.g., the same server 210) or in different components (e.g., different servers). Each of the various components of the tenant specific tagging model 230 and the global tagging model 235 are further described with respect to FIGS. 4 through 6.

A natural language query 215-a may be received by the system and initially processed by the tenant specific tagging model 230. In some examples, a pre-process may identify whether a received query is a keyword search or a natural language query/search before being processed by the tenant specific tagging model 230. A conceptual query (CQ) parser 305 may parse and tokenize the query. The tokenized query may then be processed by object pretagger 310 and value pretagger 315 of the tenant specific tagging model 230. It should be understood that other types of pretaggers configured for the tenant specific tagging model 230 may be used within the scope of the present disclosure. The object pretagger 310 may be configured to identify data objects that are used by multiple tenants of the database system. However, such objects may be renamed by the particular tenant associated with the tenant specific tagging model 230. The value pretagger 315 may utilize the output of the object pretagger 310 and the tokenized query to identify tokens that correspond to a value. As described herein, the value may be a part of a value/name pair as a picklist item. Because the value pretagger 315 may utilize the output of the object pretagger 310 to identify the values, the value pretagger 315 are chained. Or, in other words, the value pretagger 315 is dependent upon the object pretagger 310 to identify the values.

Objects and values may be examples of pre-configured data type identifiers that are configured for or used by the plurality of tenants of the database system. As such, the tenant specific tagging model 230 identifies pre-configured data type identifiers (e.g., objects, values) that are used by the plurality of tenants but may be renamed or reconfigured for the particular tenant to which the tenant specific tagging model 230 is associated. As such, each tenant that uses the techniques described herein may have a respective tenant specific tagging model 230. Further, each tenant specific tagging model 230 may have different types of data type identifier pretaggers dependent on the respective configurations. Yet further, each pretagger may be chained in different orders, depending on the configuration.

The output of the tenant specific pretaggers (e.g., the value pretagger 315) may be transmitted to a candidate generation component 325 of the global tagging model 235.

The output may include a listing of tokens with associated tags that were identified by the tenant specific tagging model 230. The candidate generation component 325 may generate candidates for global pretagging based on possible permutations or groupings of the output of the tenant specific tagging model 230. A pretagging candidate ranking and truncation component 330 of the global tagging model 235 may implement rules for candidate truncation (e.g., deletion) and ranking. Candidates may be deleted because they may correspond to invalid queries. The candidates may be ranked using rules that prioritize based on coverage and semantic closeness.

A normalization component 335 of the global tagging model 235 may inject or replace tokens of the ranked candidates with the pre-configured data type identifiers identified by the tenant specific tagging model 230. These normalized and ranked candidates may be processed by a NER tagging component 340, which may be an example of a machine learning model, may identify concepts or categories (e.g., organization, person, time, place) in the normalized candidates. A tree generation component 345 of the global tagging model 235 may generate a set of semantic search trees based on the output of the NER tagging component 340. The set of semantic search trees may be transmitted by a resolution component 320 of the tenant specific tagging model 230. The resolution component may determine which semantic search trees are valid. The valid search trees may be executed on the datastore 240 as database queries. Results may be produced and returned to the client (e.g., user device 205 of FIG. 2).

Various features and techniques are described and illustrated with reference to one of the tenant specific tagging model 230 and the global tagging model 235. However, it should be understood that some of the features may be implemented in one or the other of the two models. For example, one or more of candidate generation, truncation, ranking, and normalization may be implemented in the tenant specific tagging model 230 instead of the global tagging model 235.

Figure 4:
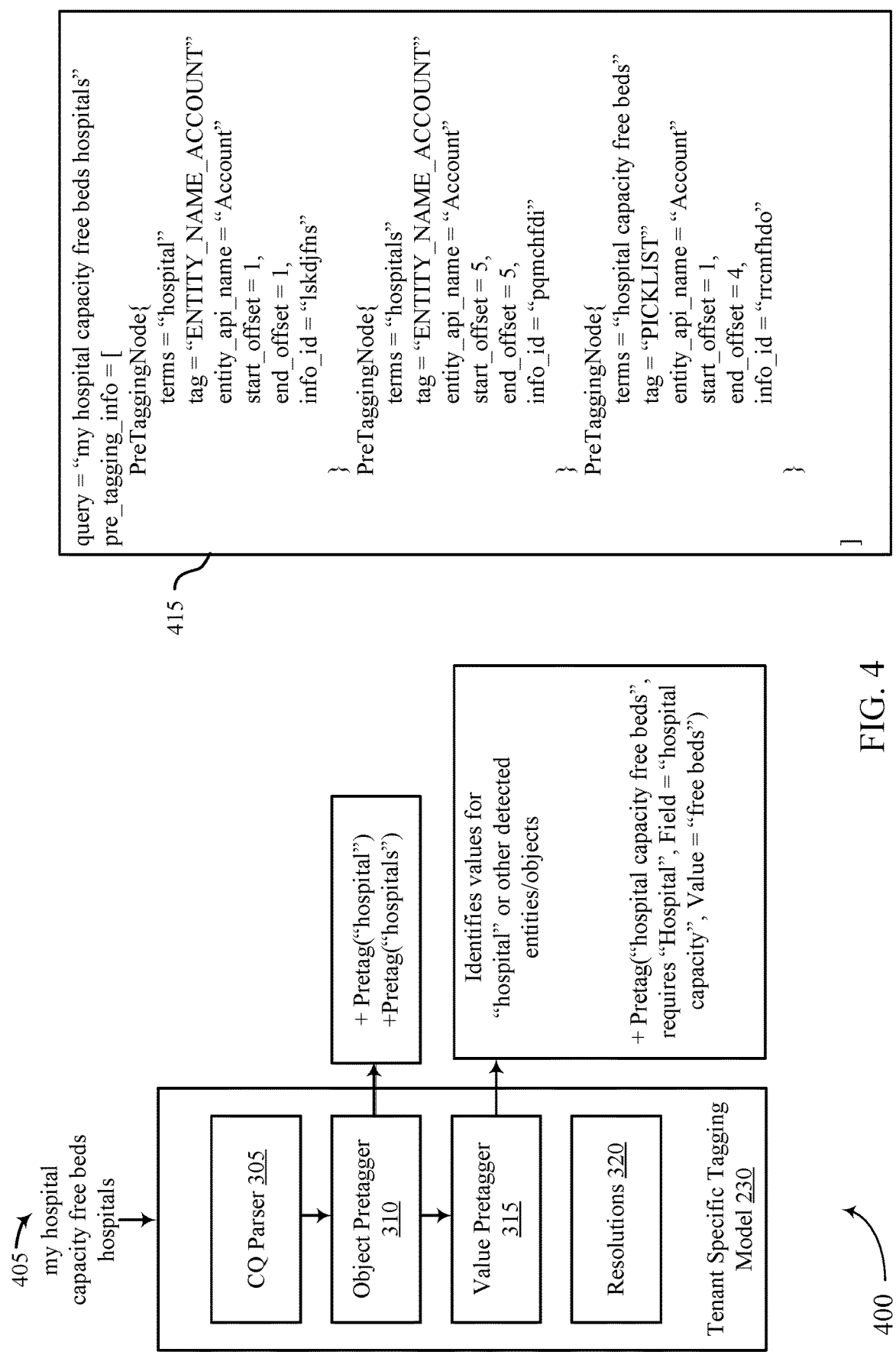
FIG. 4 illustrates an example of a tagging system that supports tenant specific and global pretagging for natural language queries in accordance with aspects of the present disclosure.

FIG. 4 illustrates an example of a tagging system 400 that supports tenant specific and global pretagging for natural language queries in accordance with aspects of the present disclosure. The tagging system 400 includes the tenant specific tagging model 230 and the respective components as described with respect to FIGS. 2 and 3.

A natural language query 405 ("my hospital capacity free beds hospitals") may be received at the system and processed by the tenant specific tagging model 230 as well as the global tagging model. The CQ parser 305 may parse and tokenize the query. For example, the CQ parser 305 may remove articles or other terms and generate a set of tokens. The set of tokens may include a token for each remaining term or phrase of the query, for example. The object pretagger 310 may process the set of tokens produced by the CA parser 305, and may be configured to identify tokens that correspond to data objects, which may be examples of a pre-configured data type identifier, in the query. In some examples, the object pretagger 310 may use a machine learning model that is trained on the data schema of the tenant. In other examples, the object pretagger 310 may use mappings of named entities to data type identifier names. Further, as described herein, the object pretagger 3210 may use tenant specific database or search index lookups to identify tokens that correspond to data objects.

For example, the object pretagger 310 may document that pre-configured data type identifiers have been changed for a particular tenant. As illustrated in FIG. 4, the object pretagger 310 has identified "hospital" and "hospitals" from the query as potentially being objects. As illustrated in data structure 415, "hospital" and "hospitals" are tagged as "ENTITY_NAME_ACCOUNT" (referred to as "account" or "entity" herein), which may be an example of an object type that is used by a plurality of tenants of the database system. That is, each tenant or some tenants may use the object "ENTITY_NAME_ACCOUNT" but various tenants may rename the object. As such, the tenant specific tagging model 230 may be able to capture changes to the data schema (e.g., changed object names) for each tenant, instead of having to retrain a global model when a tenant changes a name. Further, this technique prevents sharing of data schemas with other tenants, which improves privacy, among other benefits.

The value pretagger 315 may be an example of a data type identifier that is dependent on the object pretagger 310. The value pretagger 315 may identify values or name-value pairs that are associated with identified entities. As illustrated in FIG. 3, the value pretagger 315 may identify that a field "hospital capacity" from the query is associated with the account or entity "hospital" (e.g., identified by the object pretagger 310) and includes a value "free beds." As discussed herein, the name-value pair may be an example of a picklist. To identify the values or name-value pairs, the value pretagger 315 may retrieve one or more fields that are associated with the entities that are identified by the object pretagger 310 (e.g., hospital entity). Thus, the value pretagger 315 may be able to identify whether the fields include a field that is indicated by the query, such as "hospital capacity." The value pretagger 315 may also retrieve values from the identified field to determine whether the field includes any values that are indicated by the query, such as "free beds." Thus, the value pretagger 315 identifies that the terms "hospital capacity free beds" corresponds to a picklist (e.g., name-value pair) that may be a data type that is used by a plurality of tenants of the multi-tenant system.

As illustrated in data structure 415 and as previously described, the three different terms have been identified as corresponding to a data type that may be used my multiple tenants of the multi-tenant system. The terms "hospital" and "hospitals" are identified as entities (accounts), and the term "hospital capacity free beds" is identified as a picklist. The data structure 415 may also include application programming interface (API) names associated with the identified entities, start and ending offset of the terms, any dependences for the data type, and an identifier. The data structure 415 (e.g., "pre_tagging_info") and the parsed query may be transmitted to and processed by the global tagging model 235, as described further herein.

FIG. 5 illustrates an example of a tagging system 500 that supports tenant specific and global pretagging for natural language queries in accordance with aspects of the present disclosure. The tagging system 500 includes the global tagging model 235 and the respective components as described with respect to FIGS. 2 and 3. The global tagging model 235 may receive or access a data structure (e.g., data structure 415 of FIG. 4) as generated by the tenant specific tagging model 230. The tagging system 500 illustrates example operations performed by candidate generation component 325 and pretagging candidate ranking and truncation component 330.

The candidate generation component 325 may generate possible combinations of tagged tokens as identified by the tenant specific tagging model 230. As illustrated and as previously described, the pretagged tokens include "hospital," "hospitals," and "hospital capacity free beds." Thus, the candidate generation component 325 may generate possible permutations or groupings (e.g., candidates 505) of tokens. Candidates 505-$a$, 505-$b$, and 505-$c$ are candidates with a single tagged token. For example, candidate 505-$b$ includes the tagged token "hospital capacity free beds." Candidates 505-$d$, 505-$e$, and 505-$f$ are candidates with two tagged tokens, and candidate 505-$g$ is a candidate with each of the three tagged tokens.

After the candidates 505 are generated, the pretagging candidate ranking and truncation component 330 may delete candidates based on some truncation rules and rank candidates based on nested ranking rules 515. Each candidate 505 may be validated based on various rules. For example, candidate 505-$b$ may be deleted because the token "hospital capacity free bed" is identified as a picklist, which may depend on one of the entities (e.g., account "hospital" or "account hospitals"). More particularly, without the objects from which the picklist depends, the picklist may not provide adequate meaning or results. Further, candidate 505-$d$ may be deleted because of overlapping tokens. That is, since the phrase "hospital capacity free beds" and "hospital" share the token hospital, this may be categorized as an invalid candidate. Candidate 505-$e$ may be valid since the tokens are not overlapping and there are not multiple objects or entities identified. Candidate 505-$f$ may be removed since there are two objects identified, which may result in an invalid database query. Similarly, candidate 505-$g$ may be invalidated due to multiple objects/entities and overlapping tokens.

The pretagging candidate ranking and truncation component 330 may rank the remaining candidates to prioritize for (1) coverage and (2) semantic closeness. The candidates may be ranked according to ranking rules 515, which also illustrate examples for consideration according to the rules. The token(s) with boxes indicates that token(s) is/are tagged. The candidates may first be ranked for coverage according to a first ranking rule which prioritizes candidates with the highest or higher count of pretagged tokens. As illustrated in the example, the first candidate is ranked higher since it has three pretagged tokens ("account"=1 and "industry media"=2 for a total of 3) relative to the second candidate with one tagged token ("account"). This rule prioritizes for coverage since it prioritizes those candidates with more tokens. As applied to the valid and ranked candidates of the ongoing example, the candidate with "hospital capacity free beds" and "hospitals" is ranked first, since it has more tagged tokens (5) than the other candidates (1 each). The remaining candidates ("hospital" and "hospitals") are tied for the amount of pretagged tokens (1), so the second rule is applied.

According to the second candidate ranking rule, the candidates having the lowest number of pretagged concepts are prioritized. In the example of the second rule, the first candidate query has two pretagged concepts (e.g., objects or data types), while the second query has three pretagged concepts. Since the first candidate has fewer pretagged concepts, it is prioritized higher than the second candidate. This rule prioritizes for semantic closeness since it keeps more tokens together in a concept. As applied to the ongoing example, the remaining candidates tie since each candidate ("hospital" and "hospitals") each have one pretagged concept (e.g., account). According to the third candidate ranking rule, the candidates having the concepts that are tagged at the end of the candidate/query are prioritized over candidates with concepts tagged earlier in the query. As illustrated in the example, the first candidate is ranked before the second candidate, since the first candidate has the concept "accounts" at the end of the query, while the second candidate has "lead" at the beginning of the query. This rule is based the tendency of a user to enter concepts, entities, accounts, etc. at the end of the query, and thus these would be a more likely query or user intent.

FIG. 6 illustrates an example of a tagging system 600 that supports tenant specific and global pretagging for natural language queries in accordance with aspects of the present disclosure. The tagging system 600 includes the global tagging model 235 and the respective components as described with respect to FIGS. 2 and 3. The global tagging model 235 may receive or access the ranked candidates as output by the pretagging candidate ranking and truncation component 330 as described with respect to FIG. 5. The tagging system 600 illustrates example operations performed by normalization component 335, NER tagging component 340, and tree generation component 345 of the global tagging model 235 and the resolution component 320 of the tenant specific tagging model 230.

The normalization component 335 may process the ranked candidates to normalize the ranked candidates for processing by the NER tagging component 340. For example, the normalization component 335 may replace the tokens of the query with the identified pretagged entities/concepts for each ranked candidate. For example, the first ranked candidate has the concept (e.g., data type) "hospital capacity free beds" which is identified as a picklist, and the concept "hospitals," which is identified as an account (ENTITY_ACCOUNT). The query is "my hospital capacity free beds hospitals." Thus, the normalization component 335 may replace the tokens with he identified data type. Thus, the first ranked candidate results in "my PICKLIST ENTITY_ACCOUNT" since "hospital capacity free beds" is replaced with "PICKLIST" and "hospitals" is replaced with "ENTITY_ACCOUNT." The ranked candidates 2 and 3 are similarly processed as illustrated in FIG. 6.

These normalized query candidates are processed by the NER tagging component 340, which may be an example of a machine learning model that is configured to identify various global concepts, such as names, times, locations, organizations, groups, etc. The model of the NER tagging component 340 may be trained on various global concepts. Thus, the normalization component removes the tokens that correspond to the identified tenant specific concepts and replaces such tokens with the concepts that may be used by the plurality of entities. More particularly, the tokens that correspond to the tenant specific concepts are removed since the NER tagging component 340 may not be configured to identify or process such concepts. Thus, the NER tagging component 340 may identify tokens that remain after the concepts are injected. Further, the normalization operation may promote data privacy, in that the NER model may not process tenant specific concepts.

The model of the NER tagging component 340 may output a set of identified NER tags (concepts) for each candidate query. For the first candidate, the NER model may identify the term "my" in the query as corresponding to a database query term (category) "MINE." The input concepts may be identified as corresponding to a category by the model, but these categories may be ignored, since the system has already identified tags. According to the second query, the NER model may identify that the term "hospital capacity" corresponds to an organization ("ORG") and that the terms "free" and "beds" correspond to the category "other" ("O"). The "other" category may mean that the NER model was unable to adequately identify that the terms correspond to any specific concept.

The tree generation component 345 may translate the queries with the concepts tagged by the NER tagging component 340 into a representation of a semantic search tree. The representations are for illustrative purposes, and other representations of semantic search trees may be used. The root node of the tree may be selected as the identified object for each query. As such, since each query has an "account" as the object, the root node is selected as account ("acc"). The numbers in the representations of the semantic tree correspond to the position in the query of the respective element. For example, the first representation of the semantic search tree is "acc(2, mine(0), picklist (1))," where "2" indicates the location of the root ("acc"), (0) indicates the position of the mine concept, and (1) indicates the position of the picklist.

The tree generation component 345 also applies a set of ranking rules to rank the semantic search trees. These tree ranking rules prioritize for coverage and semantic closeness. As illustrated in the example, the first tree ranking rules prioritizes the trees that have the highest non-other token count to prioritize coverage. That is, the first rule prioritizes semantic trees where the elements have been tagged with something that is not "other" and prioritizes those trees with the highest token count. The second rule prioritizes the trees having the lowest number of non-other nodes. Thus, the first rule uses the actual token count (e.g., "einstein search" is two tokens), whereas the second rule uses the node account (e.g., "einstein search" is one node). Accordingly, the second rule prioritizes based on semantic closeness by keeping elements together based on the fewest number of non-other nodes. The third rule prioritizes the remaining trees that have the highest root position, since, as discussed herein, humans have the tendency to place entities or concepts at the end of the query. Application of these rules to the ongoing example results in the ranked trees illustrated in FIG. 6.

The ranked trees may be transmitted to or accessed by the tenant specific tagging model 230 for processing by the resolution component 320. The resolution component 320 may determine whether the ranked semantic trees are valid in the order of ranking. If the first ranked tree is valid, then the tree may be interpreted as a conceptual query and executed against the database (e.g., datastore 240 of FIGS. 2 and 3). In some examples, the semantic trees with an "other" node may be discarded as invalid. In other examples, the "other" nodes may be used in post processing (e.g., after the valid nodes checked against the database). If the other nodes are still not useable, then the tree may be discarded. One of the resolution rules determines whether a NER tagged element (e.g., person, organization) is in the database. For example, if the tagging process tagged "my hospital capacity free" as an organization ("org") in one of the queries, then the resolution component 320 determines whether a record in the database corresponds to the identified organization. If not, then the tree may be discarded. As another example, the query "Salesforce opportunities" may result in "opportunities" being tagged as a "opportunity" object by the tenant specific tagging model 230 and "Salesforce" being tagged as an organization or "org." The resolution component 320 may determine whether the datastore 240 includes a record in the database corresponding to "Salesforce." In some examples, the resolution component 320 may determine whether each query is valid in the ranked order, and terminate once a valid tree is identified. In other cases, the resolution component 320 may check each ranked tree.

Once the valid tree(s) are identified, the system may execute one or more database queries on the datastore using the semantic tree. For example, for the first tree in FIG. 6, the system may query "accounts" where user is the owner ID (e.g., because it includes "mine"), and the field of the picklist is "hospital capacity" and the value is "free beds." The database may return some record or a listing of records, which may be indicated to the user (e.g., at user device 205 of FIG. 2). Using these techniques, the system may identify better results than would be performed doing a simple keyword search, and the system may account to tenant specific schemas while also maintaining privacy concerns related to the tenant data.

Figure 7:
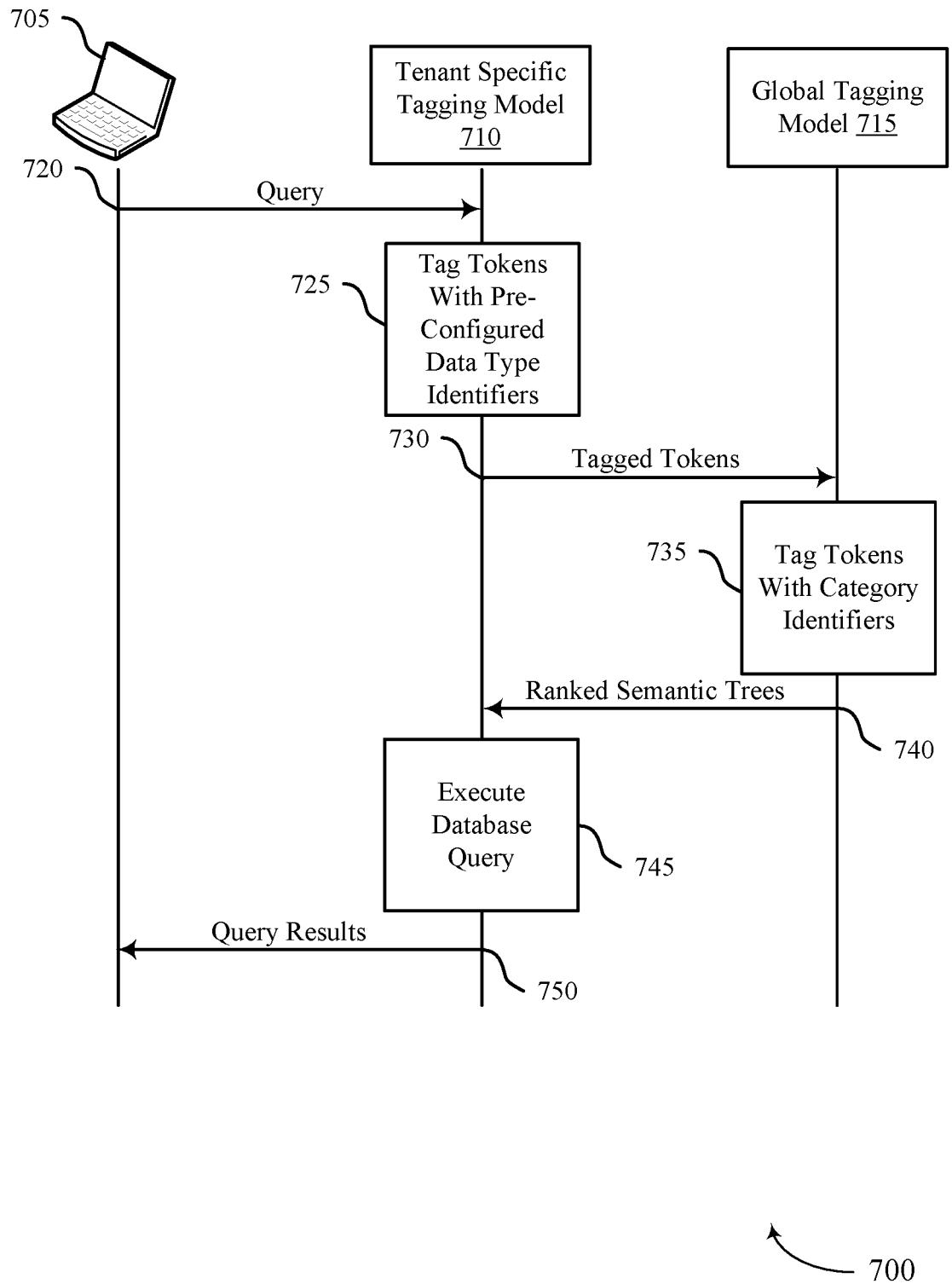
FIG. 7 illustrates an example of a process flow diagram that supports tenant specific and global pretagging for natural language queries in accordance with aspects of the present disclosure.

FIG. 7 illustrates an example of a process flow diagram 700 that supports tenant specific and global pretagging for natural language queries in accordance with aspects of the present disclosure. The process flow diagram 700 includes a user device 705, which may be an example of the user device 205 as described with respect to FIG. 2. The process flow diagram 700 also includes a tenant specific tagging model 710, which may be an example of the tenant specific tagging model 230 as described with respect to FIGS. 2 through 6, and a global tagging model 715, which may be an example of the global tagging model 235 as described with respect to FIGS. 2 through 6. The tenant specific tagging model 710 may be implemented by a server (e.g., server 210 of FIG. 2) and the global tagging model 715 may be implemented by a server (e.g., server 210 of FIG. 2). In some examples. the tenant specific tagging model 710 and the global tagging model 715 may be implemented in the same server or in different server of a database system. The tenant specific tagging model 710 and the global tagging model 715 are illustrated as separate components for illustrative purposes.

At 720, the database system (including the tenant specific tagging model 710 and the global tagging model 715) may receive, from the user device 705, a natural language query associated with a tenant of a plurality of tenants supported by the database system. The natural language query may be "associated with" the tenant because it is received from a tenant supported or accessed application or service. The natural language may be associated with a set of tokens based at least in part on the natural language query being parsed by a parsing component.

At 725, the tenant specific tagging model 710 that is associated with the tenant may tag the set of tokens with at least one pre-configured data type identifier that is configured for the plurality of tenants. The pre-configured data type identifier may be an example of an identifier of a data type that is used by a plurality of tenants of the multi-tenant system. The data types may be examples of entities, accounts, records, fields, values, etc. In some cases, the tenant specific tagging model may use a set of taggers (e.g., object tagger, value/picklist tagger) that are chained in a manner such that one tagger uses the tags of the previous tagger. For example, the picklist tagger may use the entities identified by the object tagger to identify picklist name-value pairs.

At 730, the set of tagged tokens may be transmitted to or accessed by the global tagging model 715.

At 735, the global tagging model may tag the set of tokens with at least one category identifier. The global tagging model 715 may use the natural language query and the at least one pre-configured data type identifier to identify the at least one category identifier. The global tagging model 715 may generate query candidates, truncate/filter/delete candidates, and rank the candidates as described herein. The global tagging model 715 may further normalize the candidates as described herein for input in a NER model. The NER model may identified categories (e.g., concepts) in the queries, generate semantic trees based on the tagged queries, and rank the trees.

At 740, the tenant specific tagging model 710, which may be associated with or have access to the tenant specific database instance, may access or receive the ranked semantic trees.

At 745, the system may execute a database query on a database associated with the tenant using the at least one pre-configured data type identifier and the at least one category identifier (e.g., that are included in the semantic tree). In some examples, the semantic trees may be checked for validity (e.g., resolved) before execution of the database queries based on the semantic tree(s).

At 750, the system may return results of execution of the query to the user device 705 for consideration by the user of the user device.

Figure 8:
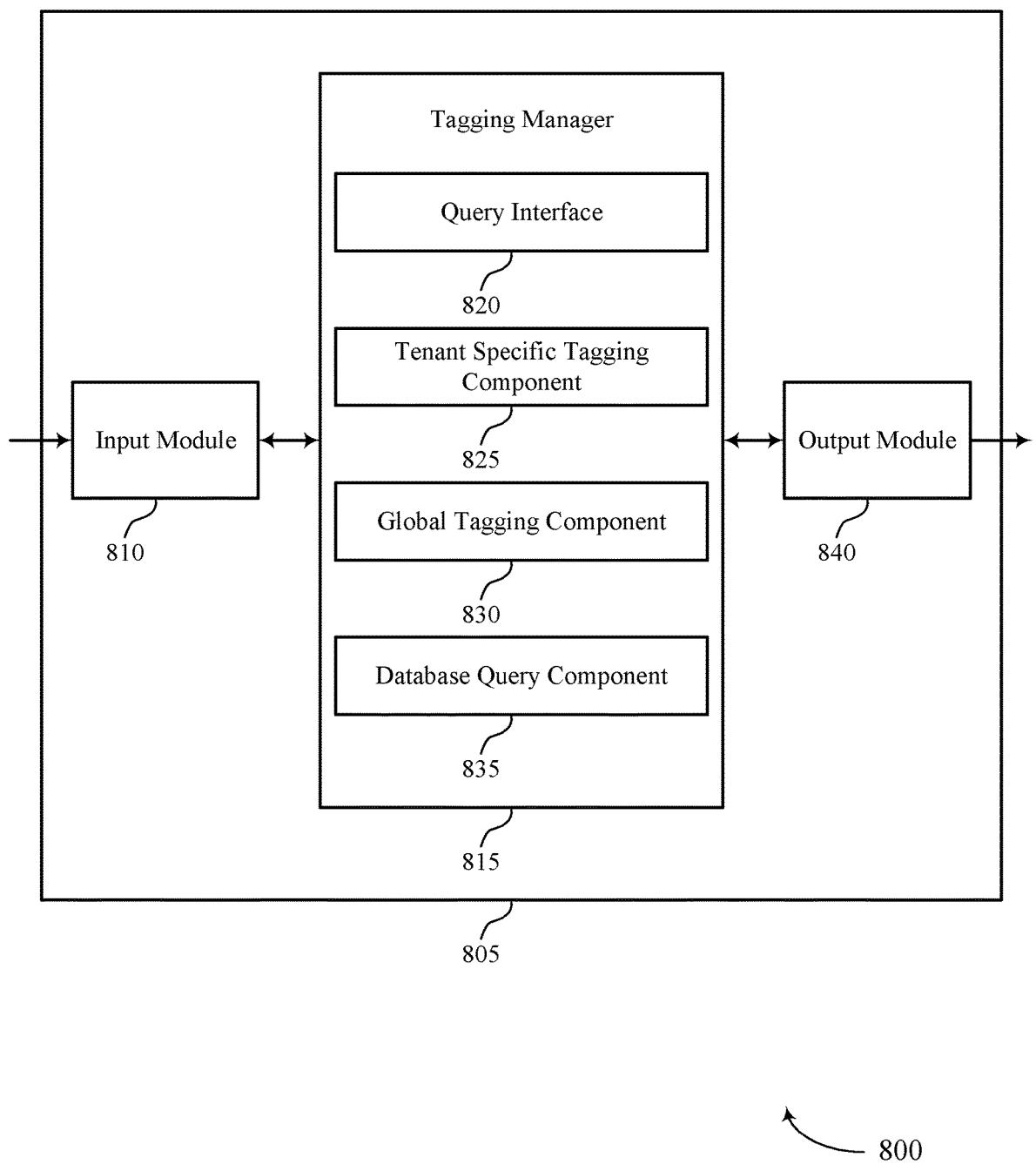
FIG. 8 shows a block diagram of an apparatus that supports tenant specific and global pretagging for natural language queries in accordance with aspects of the present disclosure.

FIG. 8 shows a block diagram 800 of an apparatus 805 that supports tenant specific and global pretagging for natural language queries in accordance with aspects of the present disclosure. The apparatus 805 may include an input module 810, a tagging manager 815, and an output module 840. The apparatus 805 may also include a processor. Each of these components may be in communication with one another (e.g., via one or more buses). In some cases, apparatus 805 may be an example of a user terminal, a database server, or a system containing multiple computing devices.

The input module 810 may manage input signals for the apparatus 805. For example, the input module 810 may identify input signals based on an interaction with a modem, a keyboard, a mouse, a touchscreen, or a similar device. These input signals may be associated with user input or processing at other components or devices. In some cases, the input module 810 may utilize an operating system such as iOS®, ANDROID®, MS-DOS®, MS-WINDOWS®, OS/2®, UNIX®, LINUX®, or another known operating system to handle input signals. The input module 810 may send aspects of these input signals to other components of the apparatus 805 for processing. For example, the input module 810 may transmit input signals to the tagging manager 815 to support tenant specific and global pretagging for natural language queries. In some cases, the input module 810 may be a component of an input/output (I/O) controller 1015 as described with reference to FIG. 10.

The tagging manager 815 may include a query interface 820, a tenant specific tagging component 825, a global tagging component 830, and a database query component 835. The tagging manager 815 may be an example of aspects of the tagging manager 905 or 1010 described with reference to FIGS. 9 and 10.

The tagging manager 815 and/or at least some of its various sub-components may be implemented in hardware, software executed by a processor, firmware, or any combination thereof. If implemented in software executed by a processor, the functions of the tagging manager 815 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The tagging manager 815 and/or at least some of its various sub-components may be physically located at various positions, including being distributed such that portions of functions are implemented at different physical locations by one or more physical devices. In some examples, the tagging manager 815 and/or at least some of its various sub-components may be a separate and distinct component in accordance with various aspects of the present disclosure. In other examples, the tagging manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The query interface 820 may receive a natural language query associated with a tenant of a set of tenants supported by the database system, the natural language query being associated with a set of tokens.

The tenant specific tagging component 825 may tag, using at least one tenant specific tagging model associated with the tenant, the set of tokens with at least one pre-configured data type identifier that is configured for the set of tenants.

The global tagging component 830 may tag, using a global tagging model that supports the set of tenants, the set of tokens with at least one category identifier, the global tagging model using the natural language query and the at least one pre-configured data type identifier to identify the at least one category identifier.

The database query component 835 may execute a database query on a database associated with the tenant using the at least one pre-configured data type identifier and the at least one category identifier.

The output module 840 may manage output signals for the apparatus 805. For example, the output module 840 may receive signals from other components of the apparatus 805, such as the tagging manager 815, and may transmit these signals to other components or devices. In some specific examples, the output module 840 may transmit output signals for display in a user interface, for storage in a database or data store, for further processing at a server or server cluster, or for any other processes at any number of devices or systems. In some cases, the output module 840 may be a component of an I/O controller 1015 as described with reference to FIG. 10.

Figure 9:
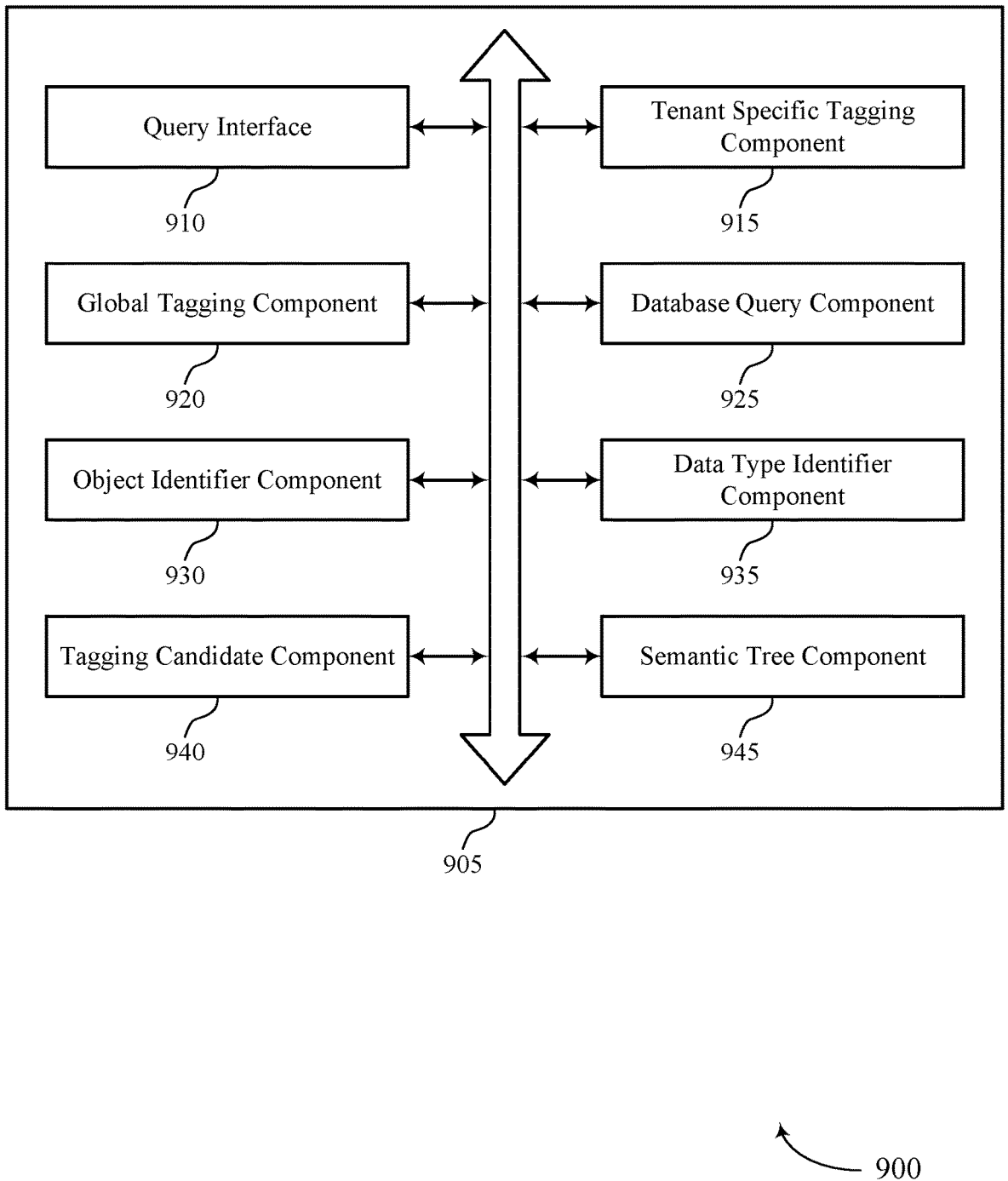
FIG. 9 shows a block diagram of a tagging manager that supports tenant specific and global pretagging for natural language queries in accordance with aspects of the present disclosure.

FIG. 9 shows a block diagram 900 of a tagging manager 905 that supports tenant specific and global pretagging for natural language queries in accordance with aspects of the present disclosure. The tagging manager 905 may be an example of aspects of a tagging manager 815 or a tagging manager 1010 described herein. The tagging manager 905 may include a query interface 910, a tenant specific tagging component 915, a global tagging component 920, a database query component 925, an object identifier component 930, a data type identifier component 935, a tagging candidate component 940, and a semantic tree component 945. Each of these modules may communicate, directly or indirectly, with one another (e.g., via one or more buses).

The query interface 910 may receive a natural language query associated with a tenant of a set of tenants supported by the database system, the natural language query being associated with a set of tokens.

In some examples, the query interface 910 may identify, that a received query is the natural language query before tagging using the at least one tenant specific tagging model and the global tagging model.

The tenant specific tagging component 915 may tag, using at least one tenant specific tagging model associated with the tenant, the set of tokens with at least one pre-configured data type identifier that is configured for the set of tenants.

The global tagging component 920 may tag, using a global tagging model that supports the set of tenants, the set of tokens with at least one category identifier, the global tagging model using the natural language query and the at least one pre-configured data type identifier to identify the at least one category identifier.

In some examples, the global tagging component 920 may replace at least one token of the set of tagging candidates with a corresponding pre-configured data type identifier corresponding to the at least one token.

The database query component 925 may execute a database query on a database associated with the tenant using the at least one pre-configured data type identifier and the at least one category identifier.

The object identifier component 930 may identify a first pre-configured data type identifier using an object identifier model.

The data type identifier component 935 may identify a second pre-configured data type identifier using a value identifier model that uses the first pre-configured data type identifier as input.

The tagging candidate component 940 may generate, before tagging using the global tagging model, a set of tagging candidates based on the at least one pre-configured data type identifier.

In some examples, the tagging candidate component 940 may remove one or more tagging candidates from the set of tagging candidates based on dependencies between the at least one pre-configured data type identifier for each tagging candidate of the set of tagging candidates.

In some examples, the tagging candidate component 940 may rank the set of tagging candidates based on each tagging candidate having a highest number of tokens that are associated with an identified pre-configured data type identifier, a lowest number of different pre-configured data type identifiers, a pre-configured data type identifier at an end of the tagging candidate, or a combination thereof.

The semantic tree component 945 may generate, using the global tagging model, a set of semantic query trees, where the database query is executed on the database using one or more of the set of semantic query trees.

In some examples, the semantic tree component 945 may generate the set of semantic query trees in a ranked order based on each semantic query tree of the set of semantic query trees having a number of tokens that are associated with an identified category identifier, a lowest number of different category identifiers, a highest root position of an identified pre-configured data type identifier, or a combination thereof.

In some examples, the semantic tree component 945 may identify one or more valid semantic query trees of the set of semantic query trees by comparing the at least one category identifier, the at least one pre-configured data type identifier, or both of a semantic query tree to values of the database, where the one or more valid semantic query trees are executed on the database.

Figure 10:
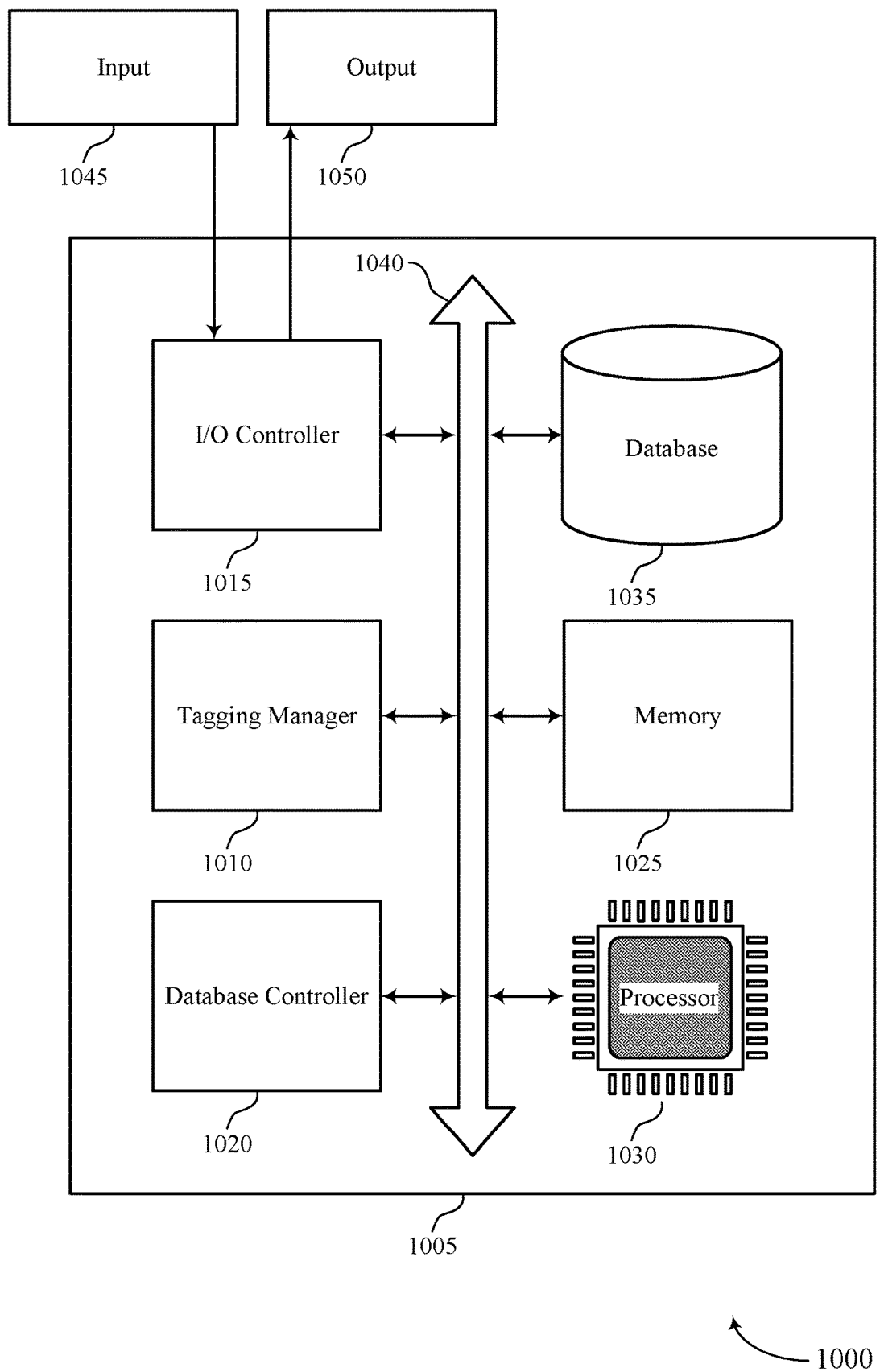
FIG. 10 shows a diagram of a system including a device that supports tenant specific and global pretagging for natural language queries in accordance with aspects of the present disclosure.

FIG. 10 shows a diagram of a system 1000 including a device 1005 that supports tenant specific and global pretagging for natural language queries in accordance with aspects of the present disclosure. The device 1005 may be an example of or include the components of a database server or an apparatus 805 as described herein. The device 1005 may include components for bi-directional data communications including components for transmitting and receiving communications, including a tagging manager 1010, an I/O controller 1015, a database controller 1020, memory 1025, a processor 1030, and a database 1035. These components may be in electronic communication via one or more buses (e.g., bus 1040).

The tagging manager 1010 may be an example of a tagging manager 815 or 905 as described herein. For example, the tagging manager 1010 may perform any of the methods or processes described herein with reference to FIGS. 8 and 9. In some cases, the tagging manager 1010 may be implemented in hardware, software executed by a processor, firmware, or any combination thereof.

The I/O controller 1015 may manage input signals 1045 and output signals 1050 for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The database controller 1020 may manage data storage and processing in a database 1035. In some cases, a user may interact with the database controller 1020. In other cases, the database controller 1020 may operate automatically without user interaction. The database 1035 may be an example of a single database, a distributed database, multiple distributed databases, a data store, a data lake, or an emergency backup database.

Memory 1025 may include random-access memory (RAM) and read-only memory (ROM). The memory 1025 may store computer-readable, computer-executable software including instructions that, when executed, cause the processor to perform various functions described herein. In some cases, the memory 1025 may contain, among other things, a basic input/output system (BIOS) which may control basic hardware or software operation such as the interaction with peripheral components or devices.

The processor 1030 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1030 may be configured to operate a memory array using a memory controller. In other cases, a memory controller may be integrated into the processor 1030. The processor 1030 may be configured to execute computer-readable instructions stored in a memory 1025 to perform various functions (e.g., functions or tasks supporting tenant specific and global pretagging for natural language queries).

Figure 11:
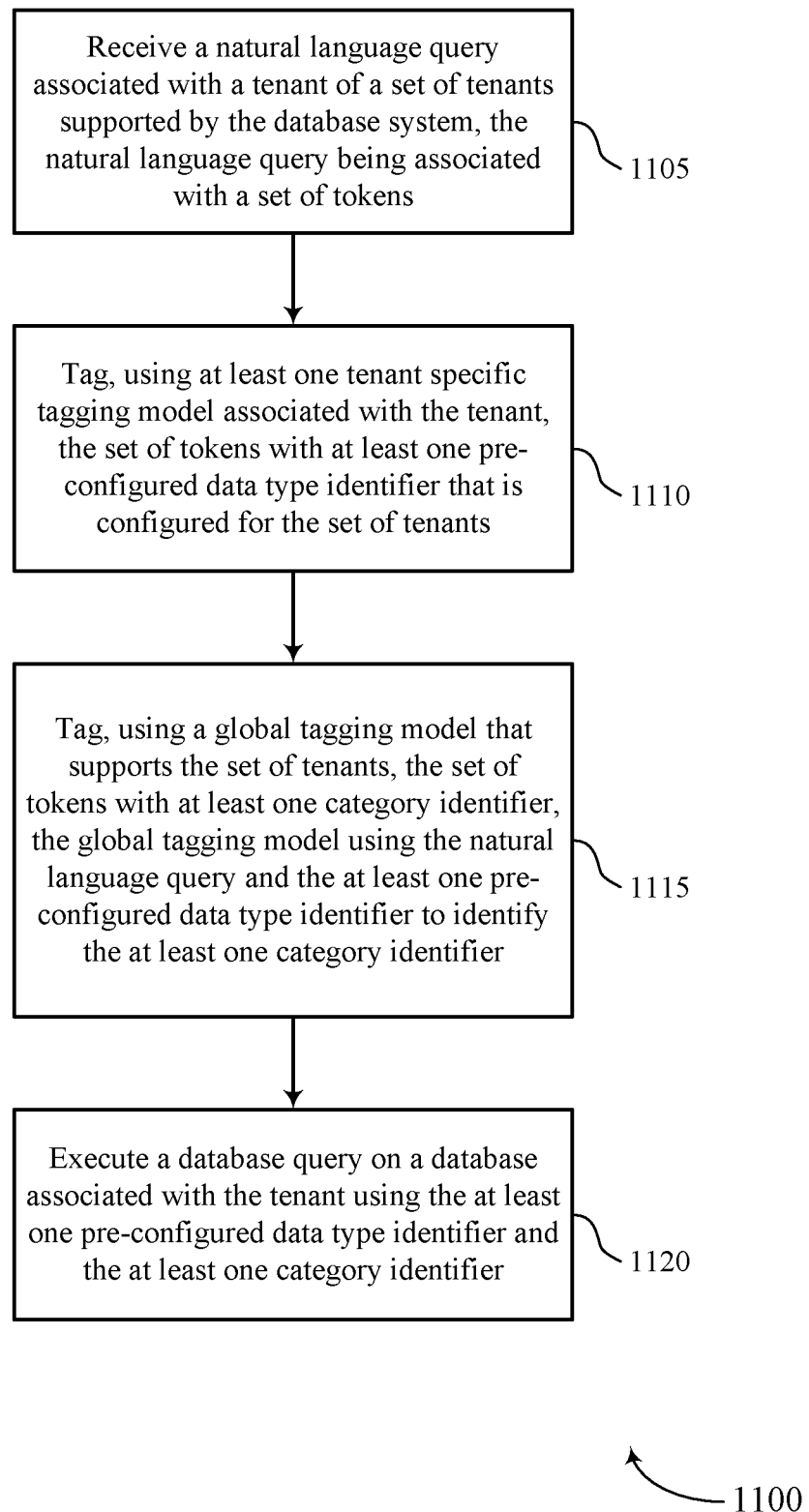
FIGS. 11 through 13 show flowcharts illustrating methods that support tenant specific and global pretagging for natural language queries in accordance with aspects of the present disclosure.

FIG. 11 shows a flowchart illustrating a method 1100 that supports tenant specific and global pretagging for natural language queries in accordance with aspects of the present disclosure. The operations of method 1100 may be implemented by a database server or its components as described herein. For example, the operations of method 1100 may be performed by a tagging manager as described with reference to FIGS. 8 through 10. In some examples, a database server may execute a set of instructions to control the functional elements of the database server to perform the functions described herein. Additionally or alternatively, a database server may perform aspects of the functions described herein using special-purpose hardware.

At 1105, the database server may receive a natural language query associated with a tenant of a set of tenants supported by the database system, the natural language query being associated with a set of tokens. The operations of 1105 may be performed according to the methods described herein. In some examples, aspects of the operations of 1105 may be performed by a query interface as described with reference to FIGS. 8 through 10.

At 1110, the database server may tag, using at least one tenant specific tagging model associated with the tenant, the set of tokens with at least one pre-configured data type identifier that is configured for the set of tenants. The operations of 1110 may be performed according to the methods described herein. In some examples, aspects of the operations of 1110 may be performed by a tenant specific tagging component as described with reference to FIGS. 8 through 10.

At 1115, the database server may tag, using a global tagging model that supports the set of tenants, the set of tokens with at least one category identifier, the global tagging model using the natural language query and the at least one pre-configured data type identifier to identify the at least one category identifier. The operations of 1115 may be performed according to the methods described herein. In some examples, aspects of the operations of 1115 may be performed by a global tagging component as described with reference to FIGS. 8 through 10.

At 1120, the database server may execute a database query on a database associated with the tenant using the at least one pre-configured data type identifier and the at least one category identifier. The operations of 1120 may be performed according to the methods described herein. In some examples, aspects of the operations of 1120 may be performed by a database query component as described with reference to FIGS. 8 through 10.

Figure 12:
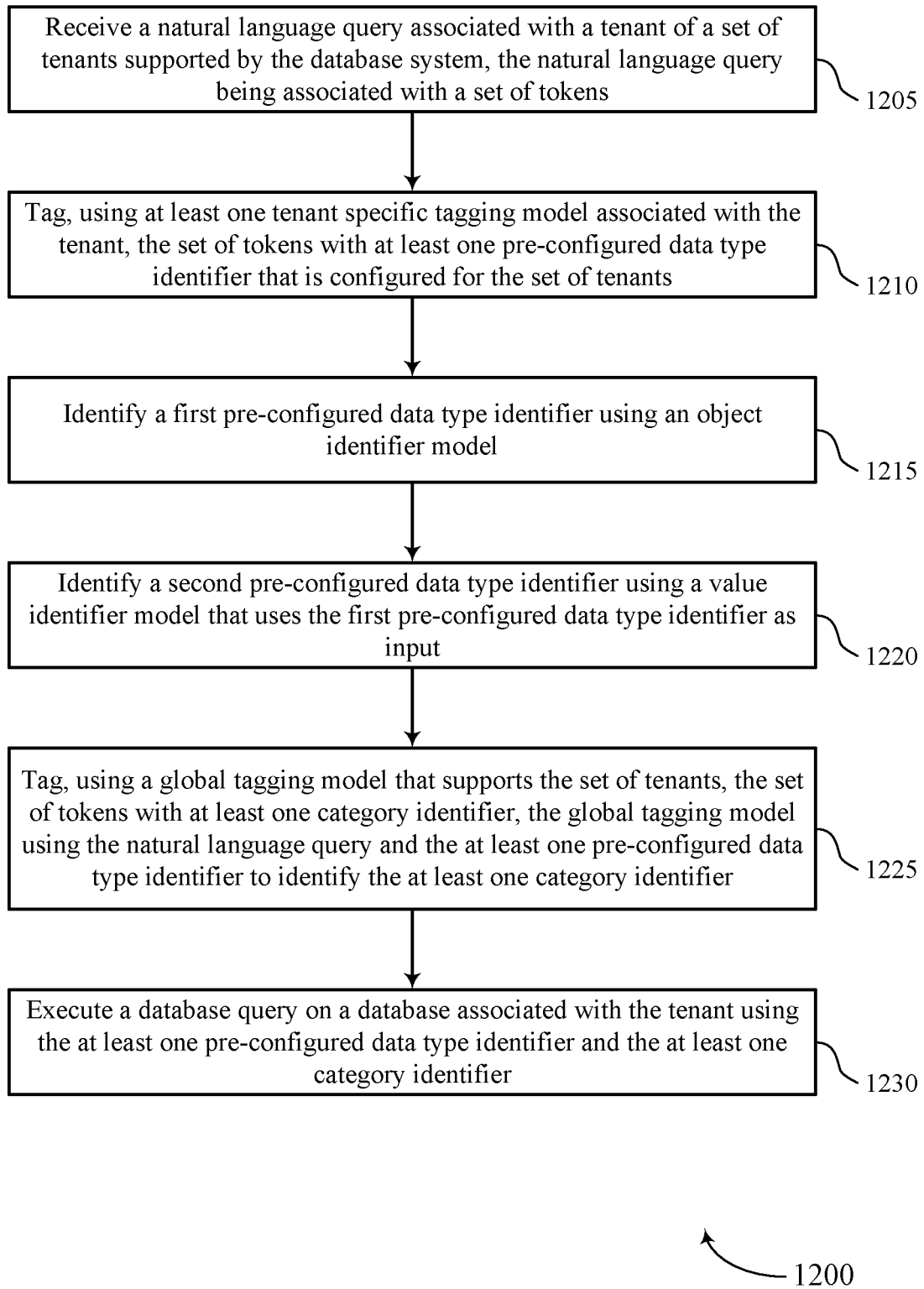

FIG. 12 shows a flowchart illustrating a method 1200 that supports tenant specific and global pretagging for natural language queries in accordance with aspects of the present disclosure. The operations of method 1200 may be implemented by a database server or its components as described herein. For example, the operations of method 1200 may be performed by a tagging manager as described with reference to FIGS. 8 through 10. In some examples, a database server may execute a set of instructions to control the functional elements of the database server to perform the functions described herein. Additionally or alternatively, a database server may perform aspects of the functions described herein using special-purpose hardware.

At 1205, the database server may receive a natural language query associated with a tenant of a set of tenants supported by the database system, the natural language query being associated with a set of tokens. The operations of 1205 may be performed according to the methods described herein. In some examples, aspects of the operations of 1205 may be performed by a query interface as described with reference to FIGS. 8 through 10.

At 1210, the database server may tag, using at least one tenant specific tagging model associated with the tenant, the set of tokens with at least one pre-configured data type identifier that is configured for the set of tenants. The operations of 1210 may be performed according to the methods described herein. In some examples, aspects of the operations of 1210 may be performed by a tenant specific tagging component as described with reference to FIGS. 8 through 10.

At 1215, the database server may identify a first pre-configured data type identifier using an object identifier model, which may be an example of at least one tenant specific tagging model. The operations of 1215 may be performed according to the methods described herein. In some examples, aspects of the operations of 1215 may be performed by an object identifier component as described with reference to FIGS. 8 through 10.

At 1220, the database server may identify a second pre-configured data type identifier using a value identifier model that uses the first pre-configured data type identifier as input. The value identifier model may be an example of at least one tenant specific tagging model. The operations of 1220 may be performed according to the methods described herein. In some examples, aspects of the operations of 1220 may be performed by a data type identifier component as described with reference to FIGS. 8 through 10.

At 1225, the database server may tag, using a global tagging model that supports the set of tenants, the set of tokens with at least one category identifier, the global tagging model using the natural language query and the at least one pre-configured data type identifier to identify the at least one category identifier. The operations of 1225 may be performed according to the methods described herein. In some examples, aspects of the operations of 1225 may be performed by a global tagging component as described with reference to FIGS. 8 through 10.

At 1230, the database server may execute a database query on a database associated with the tenant using the at least one pre-configured data type identifier and the at least one category identifier. The operations of 1230 may be performed according to the methods described herein. In some examples, aspects of the operations of 1230 may be performed by a database query component as described with reference to FIGS. 8 through 10.

Figure 13:
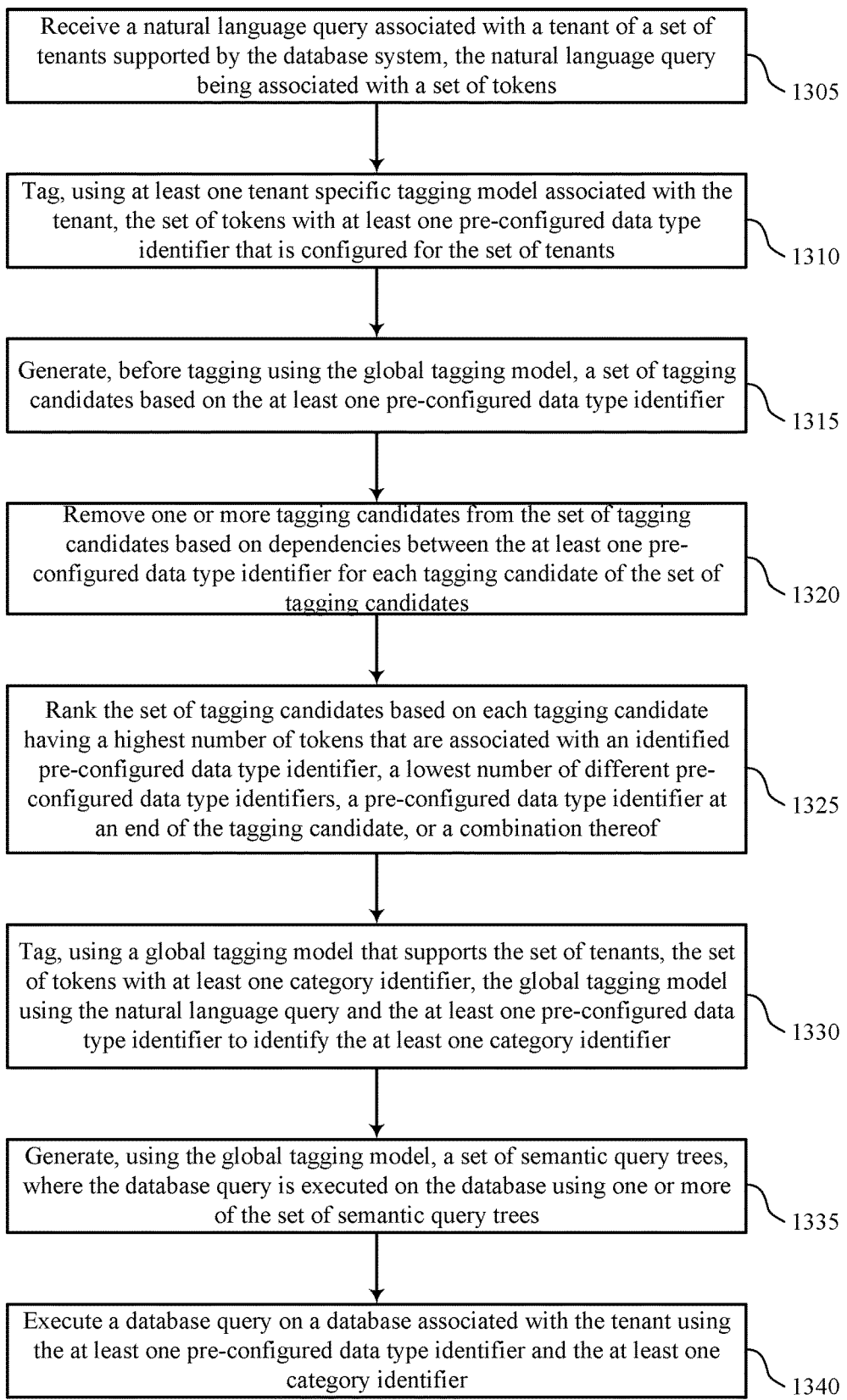

FIG. 13 shows a flowchart illustrating a method 1300 that supports tenant specific and global pretagging for natural language queries in accordance with aspects of the present disclosure. The operations of method 1300 may be implemented by a database server or its components as described herein. For example, the operations of method 1300 may be performed by a tagging manager as described with reference to FIGS. 8 through 10. In some examples, a database server may execute a set of instructions to control the functional elements of the database server to perform the functions described herein. Additionally or alternatively, a database server may perform aspects of the functions described herein using special-purpose hardware.

At 1305, the database server may receive a natural language query associated with a tenant of a set of tenants supported by the database system, the natural language query being associated with a set of tokens. The operations of 1305 may be performed according to the methods described herein. In some examples, aspects of the operations of 1305 may be performed by a query interface as described with reference to FIGS. 8 through 10.

At 1310, the database server may tag, using at least one tenant specific tagging model associated with the tenant, the set of tokens with at least one pre-configured data type identifier that is configured for the set of tenants. The operations of 1310 may be performed according to the methods described herein. In some examples, aspects of the operations of 1310 may be performed by a tenant specific tagging component as described with reference to FIGS. 8 through 10.

At 1315, the database server may generate, before tagging using the global tagging model, a set of tagging candidates based on the at least one pre-configured data type identifier. The operations of 1315 may be performed according to the methods described herein. In some examples, aspects of the operations of 1315 may be performed by a tagging candidate component as described with reference to FIGS. 8 through 10.

At 1320, the database server may remove one or more tagging candidates from the set of tagging candidates based on dependencies between the at least one pre-configured data type identifier for each tagging candidate of the set of tagging candidates. The operations of 1320 may be performed according to the methods described herein. In some examples, aspects of the operations of 1320 may be performed by a tagging candidate component as described with reference to FIGS. 8 through 10.

At 1325, the database server may rank the set of tagging candidates based on each tagging candidate having a highest number of tokens that are associated with an identified pre-configured data type identifier, a lowest number of different pre-configured data type identifiers, a pre-configured data type identifier at an end of the tagging candidate, or a combination thereof. The operations of 1325 may be performed according to the methods described herein. In some examples, aspects of the operations of 1325 may be performed by a tagging candidate component as described with reference to FIGS. 8 through 10.

At 1330, the database server may tag, using a global tagging model that supports the set of tenants, the set of tokens with at least one category identifier, the global tagging model using the natural language query and the at least one pre-configured data type identifier to identify the at least one category identifier. The operations of 1330 may be performed according to the methods described herein. In some examples, aspects of the operations of 1330 may be performed by a global tagging component as described with reference to FIGS. 8 through 10.

At 1335, the database server may generate, using the global tagging model, a set of semantic query trees, where the database query is executed on the database using one or more of the set of semantic query trees. The operations of 1335 may be performed according to the methods described herein. In some examples, aspects of the operations of 1335 may be performed by a semantic tree component as described with reference to FIGS. 8 through 10.

At 1340, the database server may execute a database query on a database associated with the tenant using the at least one pre-configured data type identifier and the at least one category identifier. The operations of 1340 may be performed according to the methods described herein. In some examples, aspects of the operations of 1340 may be performed by a database query component as described with reference to FIGS. 8 through 10.

A method of data processing at a database system is described. The method may include receiving a natural language query associated with a tenant of a set of tenants supported by the database system, the natural language query being associated with a set of tokens, tagging, using at least one tenant specific tagging model associated with the tenant, the set of tokens with at least one pre-configured data type identifier that is configured for the set of tenants, tagging, using a global tagging model that supports the set of tenants, the set of tokens with at least one category identifier, the global tagging model using the natural language query and the at least one pre-configured data type identifier to identify the at least one category identifier, and executing a database query on a database associated with the tenant using the at least one pre-configured data type identifier and the at least one category identifier.

An apparatus for data processing at a database system is described. The apparatus may include a processor, memory coupled with the processor, and instructions stored in the memory. The instructions may be executable by the processor to cause the apparatus to receive a natural language query associated with a tenant of a set of tenants supported by the database system, the natural language query being associated with a set of tokens, tag, using at least one tenant specific tagging model associated with the tenant, the set of tokens with at least one pre-configured data type identifier that is configured for the set of tenants, tag, using a global tagging model that supports the set of tenants, the set of tokens with at least one category identifier, the global tagging model using the natural language query and the at least one pre-configured data type identifier to identify the at least one category identifier, and execute a database query on a database associated with the tenant using the at least one pre-configured data type identifier and the at least one category identifier.

Another apparatus for data processing at a database system is described. The apparatus may include means for receiving a natural language query associated with a tenant of a set of tenants supported by the database system, the natural language query being associated with a set of tokens, tagging, using at least one tenant specific tagging model associated with the tenant, the set of tokens with at least one pre-configured data type identifier that is configured for the set of tenants, tagging, using a global tagging model that supports the set of tenants, the set of tokens with at least one category identifier, the global tagging model using the natural language query and the at least one pre-configured data type identifier to identify the at least one category identifier, and executing a database query on a database associated with the tenant using the at least one pre-configured data type identifier and the at least one category identifier.

A non-transitory computer-readable medium storing code for data processing at a database system is described. The code may include instructions executable by a processor to receive a natural language query associated with a tenant of a set of tenants supported by the database system, the natural language query being associated with a set of tokens, tag, using at least one tenant specific tagging model associated with the tenant, the set of tokens with at least one pre-configured data type identifier that is configured for the set of tenants, tag, using a global tagging model that supports the set of tenants, the set of tokens with at least one category identifier, the global tagging model using the natural language query and the at least one pre-configured data type identifier to identify the at least one category identifier, and execute a database query on a database associated with the tenant using the at least one pre-configured data type identifier and the at least one category identifier.

In some examples of the method, apparatuses, and non-transitory computer-readable medium described herein, tagging using the at least one tenant specific tagging model may include operations, features, means, or instructions for identifying a first pre-configured data type identifier using an object identifier model, and identifying a second pre-configured data type identifier using a value identifier model that uses the first pre-configured data type identifier as input.

Some examples of the method, apparatuses, and non-transitory computer-readable medium described herein may further include operations, features, means, or instructions for generating, before tagging using the global tagging model, a set of tagging candidates based on the at least one pre-configured data type identifier, and removing one or more tagging candidates from the set of tagging candidates based on dependencies between the at least one pre-configured data type identifier for each tagging candidate of the set of tagging candidates.

Some examples of the method, apparatuses, and non-transitory computer-readable medium described herein may further include operations, features, means, or instructions for ranking the set of tagging candidates based on each tagging candidate having a highest number of tokens that may be associated with an identified pre-configured data type identifier, a lowest number of different pre-configured data type identifiers, a pre-configured data type identifier at an end of the tagging candidate, or a combination thereof.

Some examples of the method, apparatuses, and non-transitory computer-readable medium described herein may further include operations, features, means, or instructions for replacing at least one token of the set of tagging candidates with a corresponding pre-configured data type identifier corresponding to the at least one token.

Some examples of the method, apparatuses, and non-transitory computer-readable medium described herein may further include operations, features, means, or instructions for generating, using the global tagging model, a set of semantic query trees, where the database query may be executed on the database using one or more of the set of semantic query trees.

In some examples of the method, apparatuses, and non-transitory computer-readable medium described herein, generating the set of semantic query trees may include operations, features, means, or instructions for generating the set of semantic query trees in a ranked order based on each semantic query tree of the set of semantic query trees having a number of tokens that may be associated with an identified category identifier, a lowest number of different category identifiers, a highest root position of an identified pre-configured data type identifier, or a combination thereof.

Some examples of the method, apparatuses, and non-transitory computer-readable medium described herein may further include operations, features, means, or instructions for identifying one or more valid semantic query trees of the set of semantic query trees by comparing the at least one category identifier, the at least one pre-configured data type identifier, or both of a semantic query tree to values of the database, where the one or more valid semantic query trees may be executed on the database.

Some examples of the method, apparatuses, and non-transitory computer-readable medium described herein may further include operations, features, means, or instructions for identifying, that a received query may be the natural language query before tagging using the at least one tenant specific tagging model and the global tagging model.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing at a database system, comprising:
    receiving, via a user interface, a natural language query associated with a tenant of a plurality of tenants supported by the database system, the natural language query being associated with a set of tokens;
    tagging, using at least one tenant specific tagging model that is trained on data of the database system and specific to the tenant, at least one first token of the set of tokens with at least one pre-configured data type identifier that is configured for the plurality of tenants, the at least one pre-configured data type identifier corresponding to a data object type of a global data schema of the database system;
    tagging, using a global tagging model that supports the plurality of tenants, at least one second token of the set of tokens with at least one category identifier, the global tagging model using the natural language query and the at least one pre-configured data type identifier to identify the at least one category identifier;
    generating, using the global tagging model and using the at least one category identifier as input into the global tagging model, a set of semantic query trees, a semantic query tree including a set of nodes that are positioned based at least in part on the at least one pre-configured data type identifier for the at least one first token and the at least one category identifier for the at least one second token; and
    executing a database query on a database associated with the tenant using one or more semantic query trees of the set of semantic query trees.

2. The method of claim 1, wherein tagging using the at least one tenant specific tagging model comprises:

identifying a first pre-configured data type identifier using an object identifier model; and identifying a second pre-configured data type identifier using a value identifier model that uses the first pre-configured data type identifier as input.

3. The method of claim 1, further comprising:

generating, before tagging using the global tagging model, a set of tagging candidates based on the at least one pre-configured data type identifier; and removing one or more tagging candidates from the set of tagging candidates based at least in part on dependencies between the at least one pre-configured data type identifier for each tagging candidate of the set of tagging candidates.

4. The method of claim 3, further comprising:

ranking the set of tagging candidates based at least in part on each tagging candidate having a highest number of tokens that are associated with an identified pre-configured data type identifier, a lowest number of different pre-configured data type identifiers, a pre-configured data type identifier at an end of the tagging candidate, or a combination thereof.

5. The method of claim 3, further comprising:

replacing at least one token of the set of tagging candidates with a corresponding pre-configured data type identifier corresponding to the at least one token.

6. The method of claim 1, wherein generating the set of semantic query trees comprises:

generating the set of semantic query trees in a ranked order based at least in part on each semantic query tree of the set of semantic query trees having a number of tokens that are associated with an identified category identifier, a lowest number of different category identifiers, a highest root position of an identified pre-configured data type identifier, or a combination thereof.

7. The method of claim 1, further comprising:

identifying one or more valid semantic query trees of the set of semantic query trees by comparing the at least one category identifier, the at least one pre-configured data type identifier, or both of a respective semantic query tree to values of the database, wherein the one or more valid semantic query trees are executed on the database.

8. The method of claim 1, further comprising:

identifying, that a received query is the natural language query before tagging using the at least one tenant specific tagging model and the global tagging model.

9. The method of claim 1, wherein the at least one first token and the at least one second token comprise different tokens of the set of tokens.

10. The method of claim 1, wherein the global data schema comprises a plurality of data object type identifiers used by the plurality of tenants of the database system.

11. An apparatus for data processing at a database system, comprising:

a processor, memory coupled with the processor; and instructions stored in the memory and executable by the processor to cause the apparatus to:

receive, via a user interface, a natural language query associated with a tenant of a plurality of tenants supported by the database system, the natural language query being associated with a set of tokens;

tag, using at least one tenant specific tagging model that is trained on data of the database system and specific to the tenant, at least one first token of the set of tokens with at least one pre-configured data type identifier that is configured for the plurality of tenants, the at least one pre-configured data type identifier corresponding to a data object type of a global data schema of the database system;

tag, using a global tagging model that supports the plurality of tenants, at least one second token of the set of tokens with at least one category identifier, the global tagging model using the natural language query and the at least one pre-configured data type identifier to identify the at least one category identifier;

generate, using the global tagging model and using the at least one category identifier as input into the global tagging model, a set of semantic query trees, a semantic query tree including a set of nodes that are positioned based at least in part on the at least one pre-configured data type identifier for the at least one first token and the at least one category identifier for the at least one second token; and execute a database query on a database associated with the tenant using one or more semantic query trees of the set of semantic query trees.

12. The apparatus of claim 11, wherein the instructions to tag using the at least one tenant specific tagging model are executable by the processor to cause the apparatus to:

identify a first pre-configured data type identifier using an object identifier model; and identify a second pre-configured data type identifier using a value identifier model that uses the first pre-configured data type identifier as input.

13. The apparatus of claim 11, wherein the instructions are further executable by the processor to cause the apparatus to:

generate, before tagging using the global tagging model, a set of tagging candidates based on the at least one pre-configured data type identifier; and remove one or more tagging candidates from the set of tagging candidates based at least in part on dependencies between the at least one pre-configured data type identifier for each tagging candidate of the set of tagging candidates.

14. The apparatus of claim 13, wherein the instructions are further executable by the processor to cause the apparatus to:

rank the set of tagging candidates based at least in part on each tagging candidate having a highest number of tokens that are associated with an identified pre-configured data type identifier, a lowest number of different pre-configured data type identifiers, a pre-configured data type identifier at an end of the tagging candidate, or a combination thereof.

15. The apparatus of claim 13, wherein the instructions are further executable by the processor to cause the apparatus to:

replace at least one token of the set of tagging candidates with a corresponding pre-configured data type identifier corresponding to the at least one token.

16. A non-transitory computer-readable medium storing code for data processing at a database system, the code comprising instructions executable by a processor to:

receive, via a user interface, a natural language query associated with a tenant of a plurality of tenants supported by the database system, the natural language query being associated with a set of tokens;

tag, using at least one tenant specific tagging model that is trained on data of the database system and specific to the tenant, at least one first token of the set of tokens with at least one pre-configured data type identifier that is configured for the plurality of tenants, the at least one pre-configured data type identifier corresponding to a data object type of a global data schema of the database system;

tag, using a global tagging model that supports the plurality of tenants, at least one second token of the set of tokens with at least one category identifier, the global tagging model using the natural language query and the at least one pre-configured data type identifier to identify the at least one category identifier;

generate, using the global tagging model and using the at least one category identifier as input into the global tagging model, a set of semantic query trees, a semantic query tree including a set of nodes that are positioned based at least in part on the at least one pre-configured data type identifier for the at least one first token and the at least one category identifier for the at least one second token; and execute a database query on a database associated with the tenant using one or more semantic query trees of the set of semantic query trees.

17. The non-transitory computer-readable medium of claim 16, wherein the instructions to tag using the at least one tenant specific tagging model are executable to:

identify a first pre-configured data type identifier using an object identifier model; and identify a second pre-configured data type identifier using a value identifier model that uses the first pre-configured data type identifier as input.

18. The non-transitory computer-readable medium of claim 16, wherein the instructions are further executable to:

generate, before tagging using the global tagging model, a set of tagging candidates based on the at least one pre-configured data type identifier; and remove one or more tagging candidates from the set of tagging candidates based at least in part on dependencies between the at least one pre-configured data type identifier for each tagging candidate of the set of tagging candidates.

19. The non-transitory computer-readable medium of claim 18, wherein the instructions are further executable to:

rank the set of tagging candidates based at least in part on each tagging candidate having a highest number of tokens that are associated with an identified pre-configured data type identifier, a lowest number of different pre-configured data type identifiers, a pre-configured data type identifier at an end of the tagging candidate, or a combination thereof.

\* \* \* \* \*